United States Patent
Young

(10) Patent No.: US 10,359,107 B2
(45) Date of Patent: Jul. 23, 2019

(54) ROLLER CHAIN SPROCKET WITH RESILIENT CUSHION RINGS HAVING IMPROVED DURABILITY AND NOISE CHARACTERISTICS

(71) Applicant: Cloyes Gear and Products, Inc., Fort Smith, AR (US)

(72) Inventor: James D. Young, Chesaning, MI (US)

(73) Assignee: HH-CLOYES, INC., Fort Lauderdale, FL (US)

(*) Notice: Subject to any disclaimer, the term of this patent is extended or adjusted under 35 U.S.C. 154(b) by 161 days.

(21) Appl. No.: 15/221,572

(22) Filed: Jul. 27, 2016

(65) Prior Publication Data

US 2017/0030453 A1 Feb. 2, 2017

Related U.S. Application Data

(60) Provisional application No. 62/239,274, filed on Oct. 9, 2015, provisional application No. 62/215,400, filed
(Continued)

(51) Int. Cl.
  *F16G 13/06* (2006.01)
  *F16H 55/30* (2006.01)

(52) U.S. Cl.
  CPC .............. *F16H 55/30* (2013.01); *F16G 13/06* (2013.01); *F16H 55/303* (2013.01); *F16H 2055/306* (2013.01)

(58) Field of Classification Search
  CPC ...... F16H 55/30; F16H 2055/306; F16H 7/06; F16H 57/0006; B62M 9/00
(Continued)

(56) References Cited

U.S. PATENT DOCUMENTS

| | | | |
|---|---|---|---|
| 527,153 A | 10/1894 | Murphy et al. | |
| 975,938 A * | 11/1910 | Downey | F16H 55/30 474/161 |

(Continued)

FOREIGN PATENT DOCUMENTS

| | | |
|---|---|---|
| DE | 1 086 957 | 8/1960 |
| DE | 39 42 761 A1 | 8/1991 |

(Continued)

OTHER PUBLICATIONS

International Search Report dated Dec. 19, 2016 for International application No. PCT/US2016/044346.
(Continued)

*Primary Examiner* — Henry Y Liu
(74) *Attorney, Agent, or Firm* — Fay Sharpe LLP

(57) ABSTRACT

A roller chain sprocket includes a body with a hub and a row of teeth that extends circumferentially around the hub such that the hub extends axially outward on opposite first and second sides of the row of teeth. The teeth are separated from each other by tooth spaces, wherein each of said tooth spaces is bisected by a radial tooth space centerline. First and second elastomeric cushion rings are respectively bonded to the hub on the opposite first and second sides of the row of teeth, with cushion ring extending circumferentially about the hub and including a plurality of compression pads separated from each other by axially extending transverse grooves. Each of the compression pads includes a planar or otherwise flat outer surface that is connected to a respective preceding one of the grooves by a leading corner surface and connected to a respective trailing one of the grooves by a trailing corner surface. Each of the grooves is located radially inward from a respective associated one of the tooth spaces such that the tooth space centerline is circumferentially aligned with the trailing corner surface that connects the groove to a preceding one of the compres-
(Continued)

sion pads. The compression pads provide both primary compression for a meshing chain link row and secondary compression for the next-meshing, upstream chain link row.

19 Claims, 25 Drawing Sheets

Related U.S. Application Data on Sep. 8, 2015, provisional application No. 62/197,554, filed on Jul. 27, 2015.

(58) Field of Classification Search
USPC .......................................................... 474/161
See application file for complete search history.

(56) References Cited

U.S. PATENT DOCUMENTS

| | | | |
|---|---|---|---|
| 1,870,801 A | 8/1932 | Engstrom | |
| 2,491,974 A * | 12/1949 | Hansen | B66B 23/02 198/330 |
| 2,492,219 A | 12/1949 | Haefeli | |
| 2,953,930 A * | 9/1960 | Meyer | F16H 7/06 474/148 |
| 3,057,219 A | 10/1962 | Montgomery | |
| 3,448,629 A | 6/1969 | Pfrank et al. | |
| 3,597,985 A | 8/1971 | Jeffrey | |
| 3,889,550 A | 6/1975 | Boggs et al. | |
| 4,022,072 A | 5/1977 | Chagawa et al. | |
| 4,227,422 A * | 10/1980 | Kawashima | B62M 9/00 198/834 |
| 4,261,214 A * | 4/1981 | Watanabe | B62M 9/00 474/151 |
| 4,332,574 A | 6/1982 | Aoyama et al. | |
| 4,348,199 A * | 9/1982 | Oonuma | F16H 55/14 305/199 |
| 4,867,733 A * | 9/1989 | Yamanoi | B62M 9/00 474/161 |
| 5,224,903 A * | 7/1993 | Langhof | B62M 9/00 474/152 |
| 5,360,378 A | 11/1994 | Suzuki et al. | |
| 5,819,910 A | 10/1998 | Langer et al. | |
| 5,980,408 A * | 11/1999 | Schulz | F16H 7/06 474/151 |
| 5,984,817 A * | 11/1999 | Schulz | F16H 7/06 474/156 |
| 6,179,741 B1 * | 1/2001 | Young | F16H 7/06 474/156 |
| 6,371,874 B1 * | 4/2002 | Inoue | F16H 55/30 474/156 |
| 6,371,875 B2 | 4/2002 | Young | |
| 6,652,402 B2 * | 11/2003 | Poiret | F16G 13/06 474/156 |
| 6,656,072 B2 * | 12/2003 | Sugita | B62M 7/02 474/156 |
| 7,074,147 B2 * | 7/2006 | Young | F16H 7/06 474/156 |
| 7,094,170 B2 * | 8/2006 | Young | F16G 13/04 474/153 |
| 7,371,200 B2 | 5/2008 | Young | |
| 8,202,185 B2 * | 6/2012 | Haesloop | F16H 55/30 474/156 |
| 8,801,554 B2 | 8/2014 | Miyazawa | |
| 9,145,965 B2 * | 9/2015 | Kwon | F16H 55/30 |
| 9,933,063 B2 * | 4/2018 | Ognibene | F16H 55/14 |
| 2001/0000171 A1 | 4/2001 | Young | |
| 2002/0169044 A1 * | 11/2002 | Young | F16H 7/06 474/152 |
| 2006/0073927 A1 * | 4/2006 | Haesloop | F16H 55/30 474/161 |
| 2007/0111833 A1 * | 5/2007 | Young | F16H 7/06 474/152 |
| 2009/0093329 A1 * | 4/2009 | Markley | F16H 55/30 474/161 |
| 2009/0118047 A1 * | 5/2009 | Haesloop | F16H 55/30 474/161 |
| 2011/0300977 A1 * | 12/2011 | Hayami | F16H 55/30 474/161 |

FOREIGN PATENT DOCUMENTS

| | | |
|---|---|---|
| DE | 199 29 667 C1 | 1/2001 |
| DE | 199 61 046 A1 | 6/2001 |
| EP | 0 846 889 A1 | 6/1998 |
| EP | 846 890 A1 | 6/1998 |
| EP | 1 120 586 A2 | 8/2001 |
| FR | 1 186 486 | 8/1959 |
| FR | 2 325 804 A1 | 4/1977 |
| GB | 719694 | 12/1954 |
| GB | 1 277 277 | 6/1972 |
| JP | S57-173649 | 10/1982 |
| JP | 57-190160 | 11/1982 |
| JP | 63 214566 | 9/1988 |
| JP | 11-2312 | 1/1999 |
| JP | 2000 198483 | 7/2000 |
| JP | 2000 288645 | 10/2000 |
| JP | 2004 19673 | 1/2004 |
| JP | 2007 009973 | 1/2007 |
| JP | 2011 256886 | 12/2011 |
| SU | 386186 | 6/1973 |

OTHER PUBLICATIONS

Written Opinion dated Dec. 19, 2016 for International application No. PCT/US2016/044346.
Young, James D., SAE Technical Paper Series publication titled "*Camshaft Roller Chain Drive with Reduced Meshing Impact Noise Levels*", circulated at Noise & Vibration Conference and Exhibition, Michigan, May 5-8, 2003, ISSN 0148-7191.
International Preliminary Report on Patentability dated Feb. 18, 2018 for International application No. PCT/US2016/044346.

\* cited by examiner

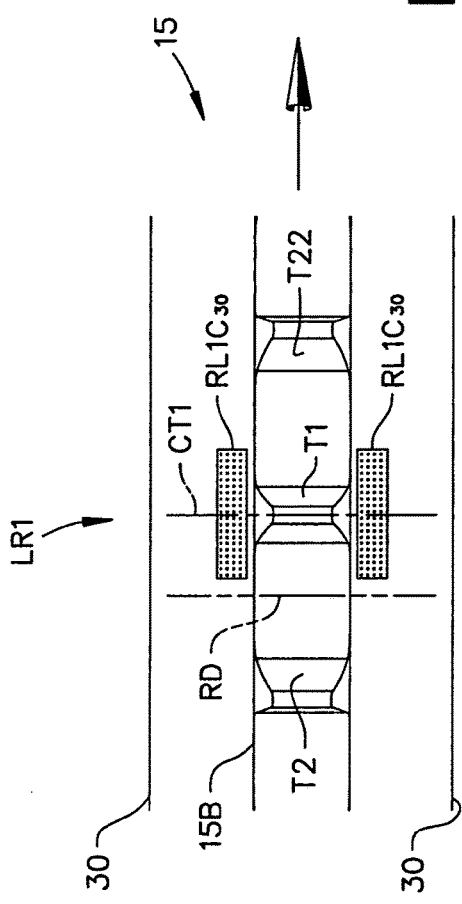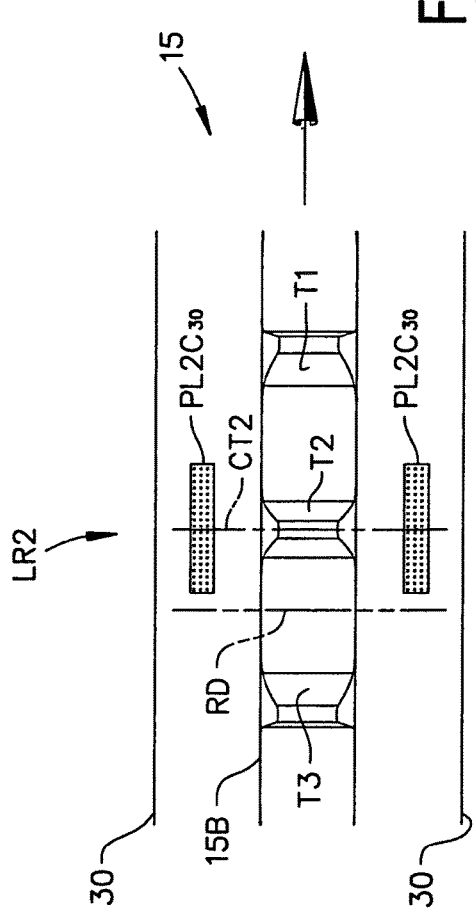

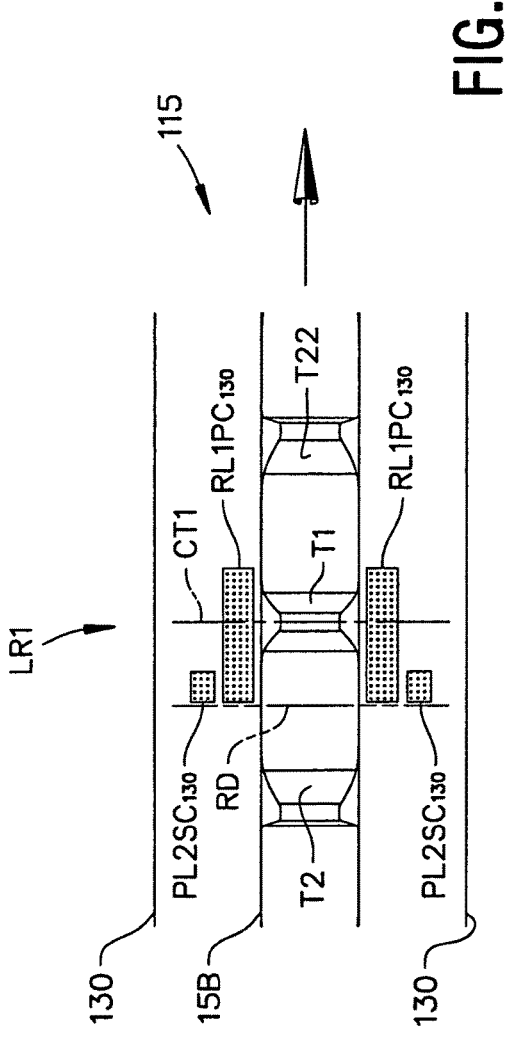

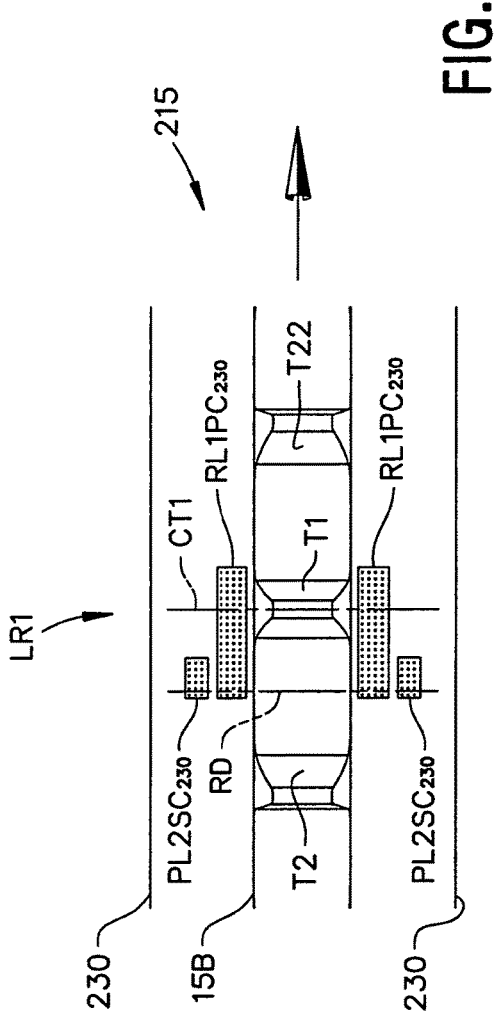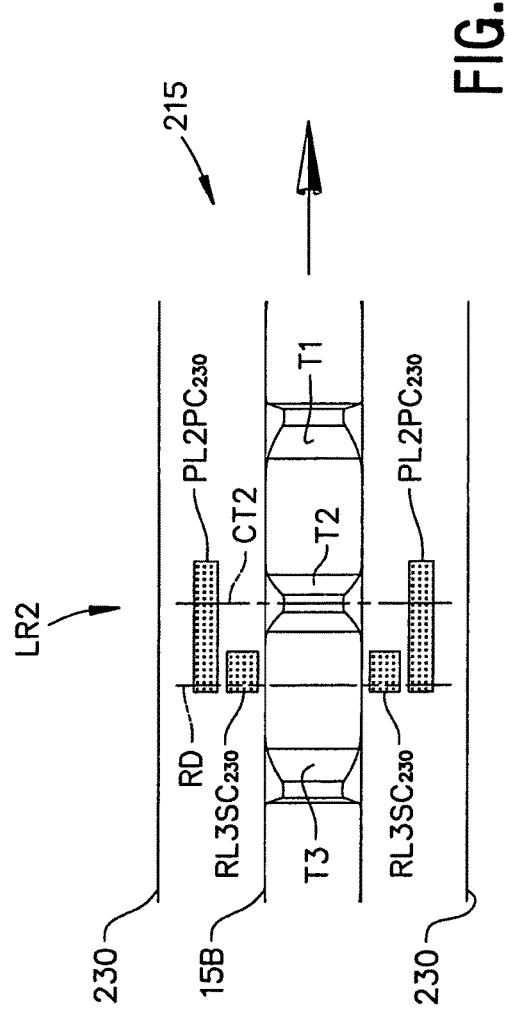

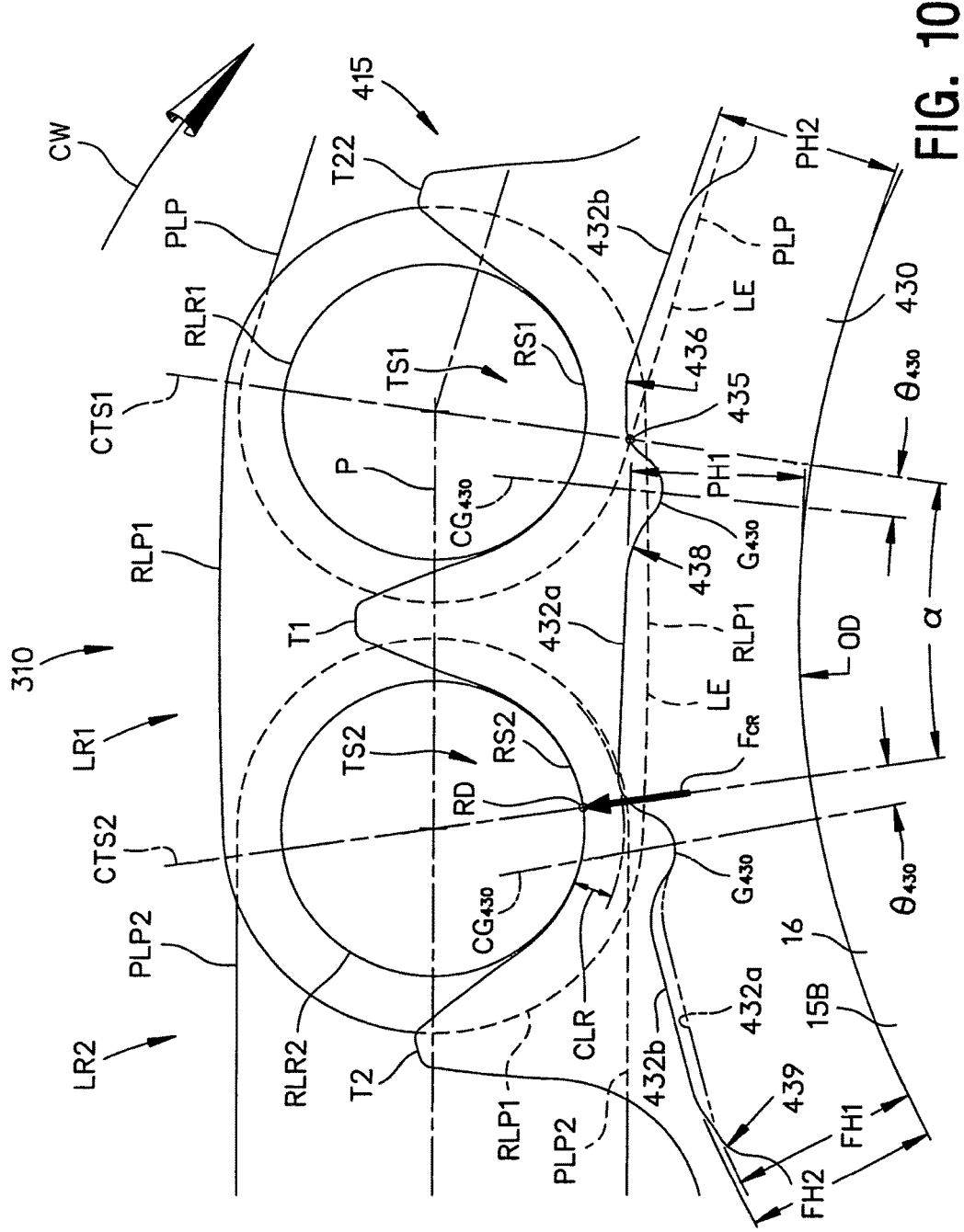

ROLLER CHAIN SPROCKET WITH RESILIENT CUSHION RINGS HAVING IMPROVED DURABILITY AND NOISE CHARACTERISTICS

CROSS-REFERENCE TO RELATED APPLICATIONS

The present application claims priority from and benefit of the filing date of: (i) U.S. provisional application Ser. No. 62/197,554 filed Jul. 27, 2015; (ii) U.S. provisional application Ser. No. 62/215,400 filed Sep. 8, 2015; and, (iii) U.S. provisional application Ser. No. 62/239,274 filed Oct. 9, 2015, and the entire disclosure of each of said prior provisional applications is hereby expressly incorporated by reference into the present application.

FIELD OF THE INVENTION

The present invention relates generally to the automotive chain drive art and it has particular application with roller chain sprockets for use in automotive engine camshaft drive applications. However, the present invention may also find utility in conjunction with other types of chain drive systems and applications where reducing the noise levels associated with chain drives is desired.

BACKGROUND OF THE INVENTION

Chain drive systems have several components of undesirable noise and a major source of roller chain drive noise is the sound generated as a roller leaves the chain span and collides with a sprocket during the meshing process. The resultant impact noise is repeated with a frequency generally equal to that of the frequency of the chain meshing with the sprocket. As is known in the art, resilient cushion rings effectively reduce the generated noise levels associated with chain-sprocket meshing.

FIG. 1 shows a roller chain 10 in meshing engagement with an exemplary known roller chain sprocket 15 comprising metallic body 15B including a cylindrical hub 16 from which a row of outwardly projecting teeth T extend circumferentially around the hub 16. The teeth T are separated from each other by tooth spaces TS, each of which comprises and is partially defined by a root surface RS that extends between and interconnects circumferentially successive teeth T. The hub 16 projects or extends axially outward on opposite sides of the row of teeth T, and the sprocket 15 further comprises first and second elastomeric cushion rings (CR) 30, comprising nitrile rubber or the like, respectively bonded to the outside diameter OD of the hub 16 on opposite first and second sides of the row of teeth T. The cushion rings 30 extend completely circumferentially around the hub 16 and comprise alternating compression pads 32 and axially extending transverse grooves $G_{30}$.

As shown in FIG. 1 and more clearly in FIG. 2, a pad 32 is substantially positioned on a sprocket tooth centerline CT1 (generally CT) and the number of pads and grooves in a cushion ring 30 will each equal the number of teeth T on the sprocket. The respective lower edges LE of the link plates of the roller chain 10, i.e., the inner or "roller" link plates RLP and the outer or "pin" link plates PLP, make contact with—and compress—the pads 32 of cushion rings 30 during the meshing process. In FIGS. 2-3A, only one of the cushion rings 30 is visible, but it is noted that the cushion ring 30 located on the opposite side of the sprocket 15 is identically structured and arranged on the sprocket 15, with common structural features angularly aligned with the visible cushion ring 30.

Each compression pad 32 includes a free height FH defined as the maximum distance by which the compression pad 32 projects radially above a fixed reference location on the sprocket body, such as the hub outside diameter OD or alternatively the axis of rotation of the sprocket body. Also, the free height circumscribes the cushion ring 30 at its high point radially outward. The compression pad 32 pad height PH is defined as the distance measured between the planar surface 32S—and normal to the planar surface—to a fixed reference location associated with the sprocket body 15B, such as a line that is tangent to the outside diameter OD or a line that passes through the axis of rotation.

Referring still to FIG. 2, the sprocket 15 rotates in a clockwise (CW) direction and a single link row LR1 of the roller chain 10 is shown at several positions of meshing progression with the link plate RLP1 perimeter having a solid line at the meshing start position and phantom lines at the interim meshing positions and at the full meshing position as the link row LR1 rotates about the center of seated roller RLR1 in a counter-clockwise (CCW) direction toward its full meshing contact at which time both the leading roller RLR1 and trailing roller RLR2 of the meshing link row LR1 are fully seated in their respective tooth spaces TS1,TS2 (generally TS) and in contact with the root diameter at location RD. It should be noted that the terms "leading" and "trailing" are in reference to the direction of travel of the chain 10 and the direction of rotation of the sprocket 15, wherein a leading features is located downstream and a trailing feature is located upstream in terms of the chain travel direction and the sprocket rotational direction. Also, the term "roller" as used herein is intended to encompass both a rotatable structure and a non-rotatable structure (e.g., a bushing) that seats in the tooth space TS1,TS2. The link row LR1 starts its meshing rotation at the instant the leading roller RLR1 impacts the sprocket body 15B in the sprocket tooth space TS1 at its theoretical meshing contact point RD (actually line contact at RD) on the root surface and concludes its meshing rotation when the trailing roller RLR2 (shown in phantom) impacts the sprocket body 15B at its meshing contact point RD in the tooth space TS2. It should be noted that the roller RLR2 is the trailing roller for link row LR1 as well as the leading roller for the adjacent trailing or upstream or next-meshing link row LR2 as shown in FIG. 3.

The tooth spaces TS1,TS2 comprise respective centerlines represented by respective tooth space center reference lines CTS1,CTS2 (generally CTS) that originate at the center or axis of rotation of the sprocket 15 and that bisect the respective tooth spaces TS1,TS2. The force vector $F_{CR}$ is a measure of the reaction damping force associated with the compression of the elastomeric cushion ring pads 32 by the link plates and $F_{CR}$ acts collinear with tooth space centerline CTS2 at the meshing impact point RD for the roller RLR2.

With continuing reference to FIG. 2 and particular reference also to FIG. 3, the link plates RLP1 of the link row LR1 contact and compress the pads 32 of the cushion rings 30 during the meshing rotation and the pad compression CMPR serves to beneficially diminish or soften the intensity of the meshing impact of the roller RLR2. As disclosed in U.S. Pat. No. 6,179,741, the entire disclosure of which is hereby expressly incorporated by reference, the elastomeric cushion rings 30 include planar compression pads 32 separated by transverse axially extending grooves $G_{30}$. The centerline $CG_{30}$ of each groove $G_{30}$ is collinear with the centerline of a tooth space CTS (CTS1 & CTS2 in FIG. 3) and each compression pad 32 is compressed only by the link plates RLP1 in the meshing link row such that the chain link plates PLP2 of the next-meshing link row LR2 do not compress the pad 32 that is located between the first and second tooth spaces TS1,TS2 in which the leading and trailing rollers RLR1,RLR2 of the meshing link row LR1 are respectively received. The compression pads 32 have an inclined planar outer surface 32S and comprise a trailing corner radius 37 where the pad outer surface 32S transitions into a trailing groove $G_{30}$. The planar surface 32S of each compression pad extends at an angle β from a trailing end of the pad outer surface 32S that is tangent to the trailing corner radius 37 to a leading end of the pad outer surface 32S that is tangent to a leading corner radius 38 where the leading end of the pad outer surface 32S transitions into the leading groove $G_{30}$, where an angle β is measured relative to a reference line REF that lies parallel to the lower edge LE of the involved fully meshed chain link plate RLP,PLP that engages the compression pad 32 or a plane tangent to the link plate lower edge LE at its midpoint if the lower edge is not a straight line (alternatively the reference line REF can be said to be parallel to the pitch chord of the sprocket for the tooth spaces TS1,TS2 involved with the meshing link row LR1). The incline of the outer surface 32S of each compression pad 32 can alternatively be measured relative to the radial reference line CT1,CT2 (generally CT) passing through the tooth center of the tooth T that lies adjacent the compression pad 32. Thus, the outer surface of each compression pad 32 contacted by the chain link plates RLP,PLP is inclined such that minimum compression will occur in the proximity of the seated and pivoting leading roller RLR1, and maximum pad compression will beneficially occur in the proximity of the trailing meshing roller RLR2, where the compression CMPR will provide a greater resistance to meshing impact. The grooves $G_{30}$ provide for minimum or no compression at the seated and pivoting roller RLR1, where compression would provide little or no benefit. Further, the grooves $G_{30}$ provide voids or spaces for the elastomeric material forming the more highly-compressed trailing ends of the pads to move into during meshing and subsequent rotation through the sprocket wrap.

Referring also to FIG. 3A, the transverse groove $G_{30}$ is formed by a first or leading groove radius 40 that has its arc center located on the tooth space centerline CTS2 and that is tangent to the second or trailing corner radius 37 of the leading or downstream pad 32 at its leading end and that is tangent to a second or trailing groove radius 42 at its trailing end. The trailing groove radius 42 also has its arc center located on the tooth space centerline CTS2 and is tangent at its outer end or trailing end to the leading corner radius 38 of the trailing or upstream pad 32. The groove G30 thus has a groove center CG30 that is aligned or coincident with the tooth space centerline CTS2.

FIGS. 3B and 3C show plan views of the compression footprint of the link plates RLP,PLP at their respective full meshing engagement positions. FIG. 3B corresponds to the sprocket position of FIG. 3 and shows the roller link plate compression footprint $RL1C_{30}$ corresponding to the link row LR1. FIG. 3C shows the sprocket rotated one tooth angle to the point where the next link row LR2 is fully meshed with the sprocket 15 and shows the (thinner) pin link plate compression footprint $PL2_{30}$ for the link row LR2. In both cases, as noted above, it can be seen that only the chain link plates of the meshing link row compress the involved pad 32 that is located between the tooth spaces in which the leading and trailing rollers of the meshing link row are respectively received, i.e., the chain link plates of the upstream, next-meshing link row do not contact the compression pad 32 that is located between the tooth spaces in which the leading and trailing rollers of the meshing link row are respectively received. In other words, each compression pad 32 is only contacted by the link plates RLP or PLP of the meshing link row, and the compression pad is not contacted by the link plates PLP or RLP of the next-meshing or upstream link row.

The effectiveness of a resilient cushion ring is measured by its ability to adequately dampen the impact of a meshing roller. For a given design configuration, greater damping is achieved by increasing the deformation (i.e., compression) of the resilient cushion rings at meshing engagement. However, increased deformation could have an adverse effect on elastomer durability and compression set due to the resulting higher compressive stresses with the increased compression. It is therefore desirable to provide an improved cushion ring design configuration with enhanced durability and with equal or a greater level of damping at a reduced level of cushion ring compression.

Although the cushion ring sprocket 15 described above has been deemed highly effective and has found commercial success, a need has been identified for a new and improved cushion ring sprocket that provides improved durability and noise attenuation characteristics for reduced noise, vibration, and harshness (NVH) levels.

SUMMARY

In accordance with one aspect of the present development, a roller chain sprocket includes a body comprising a hub and a row of teeth that extends circumferentially around the hub such that the hub extends axially outward on opposite first and second sides of the row of teeth. The teeth are separated from each other by tooth spaces, wherein each of said tooth spaces is bisected by a radial tooth space centerline. First and second elastomeric cushion rings are respectively bonded to the hub on the opposite first and second sides of the row of teeth, each cushion ring extending circumferentially about said hub and comprising a plurality of compression pads separated from each other by axially extending transverse grooves. Each of the compression pads includes a planar outer surface that is connected to a respective preceding one of said grooves by a leading corner surface and connected to a respective trailing one of said grooves by a trailing corner surface. Each of the grooves is located radially inward from a respective associated one of the tooth spaces such that the tooth space centerline is circumferentially aligned with the trailing corner surface that connects the groove to a preceding one of the compression pads.

In accordance with another aspect of the present development, a roller chain sprocket includes a body comprising a hub and a row of teeth that extends circumferentially around the hub such that the hub extends axially outward on opposite first and second sides of the row of teeth. The teeth are separated from each other by tooth spaces. First and second elastomeric cushion rings are respectively bonded to the hub on the opposite first and second sides of the row of teeth, with each cushion ring extending circumferentially about the hub and comprising a plurality of compression pads separated from each other by axially extending transverse grooves. Each of the compression pads includes a planar outer surface that is connected to a respective preceding one of said grooves by a leading corner surface and connected to a respective trailing one of said grooves by a trailing corner surface. The trailing corner surface of each of the compression pads includes a compound surface that is joined at an outer end to the planar outer surface of the compression pad and that is joined at an inner end to a trailing one of the grooves. The compound surface includes: (i) a first trailing corner surface defined by a first corner radius; (ii) a second trailing corner surface defined by a second corner radius; and, (iii) a transition surface defined by a circular arc segment that connects the first trailing corner surface with the second trailing corner surface. Each of the grooves is located radially inward from a respective associated one of the tooth spaces and the cushion rings are arranged on the hub such that the tooth space centerline of the associated tooth space is circumferentially aligned with said trailing corner surface.

In accordance with a further aspect of the present development, a roller chain sprocket includes a body with a hub. A row of teeth extends circumferentially around the hub such that the hub extends axially outward on opposite first and second sides of the row of teeth. The teeth are separated from each other by tooth spaces, and each of the tooth spaces is bisected by a radial tooth space centerline. First and second elastomeric cushion rings respectively bonded to the hub on said opposite first and second sides of the row of teeth, and each cushion ring extends circumferentially about the hub and comprises a plurality of compression pads separated from each other by axially extending transverse grooves. Each of the compression pads includes a planar outer surface that is connected to a respective preceding one of the grooves by a leading corner surface and connected to a respective trailing one of said grooves by a trailing corner surface. Each of the grooves is located radially inward from a respective associated one of the tooth spaces and the cushion rings are arranged on the hub such that the tooth space centerline of the associated tooth space is circumferentially aligned with the trailing corner surface.

BRIEF DESCRIPTION OF THE DRAWINGS

FIGS. 3B and 3C show plan views of the compression pad footprint of the chain link plates RLP1,PLP2 at their respective full meshing engagement positions;

FIG. 5C is a plan view corresponding to the sprocket position of FIG. 5 for the full meshing engagement position of the link plates RLP1 of link row LR1 that shows the compression pad footprint made by the link plates RLP1 of the fully meshed link row LR1 and by the link plates PLP2 of the upstream, next-meshing link row LR2;

FIG. 5D is similar to FIG. 5C but corresponds to the sprocket being rotated clockwise by one tooth angle such that the link row LR2 is fully meshed and the next-meshing upstream link row LR3 is at the onset of meshing, with the compression pad footprint being made by the link plates PLP2 of the fully meshed link row LR2 and by the link plates RLP3 of the next-meshing link row LR3;

FIG. 6C is a plan view corresponding to the sprocket position of FIG. 6 for the full meshing engagement position of the link plates RLP1 of link row LR1 that shows the compression pad footprint made by the link plates RLP1 of the fully meshed link row LR1 and by the link plates PLP2 of the upstream, next-meshing link row LR2;

FIG. 6D is plan view of the compression pad footprint that is similar to FIG. 6C but corresponds to the sprocket being rotated clockwise by one tooth angle such that the link row LR2 is fully meshed and the next-meshing upstream link row LR3 is at the onset of meshing, with the compression pad footprint being made by the link plates PLP2 of the fully meshed link row LR2 and by the link plates RLP3 of the next-meshing link row LR3;

FIG. 10 is a view that is similar to FIG. 9, but shows an alternative embodiment in which the compression pads of the cushion ring are defined with different pad heights that are arranged in an alternating sequence about the sprocket body.

DETAILED DESCRIPTION

Figure 4:
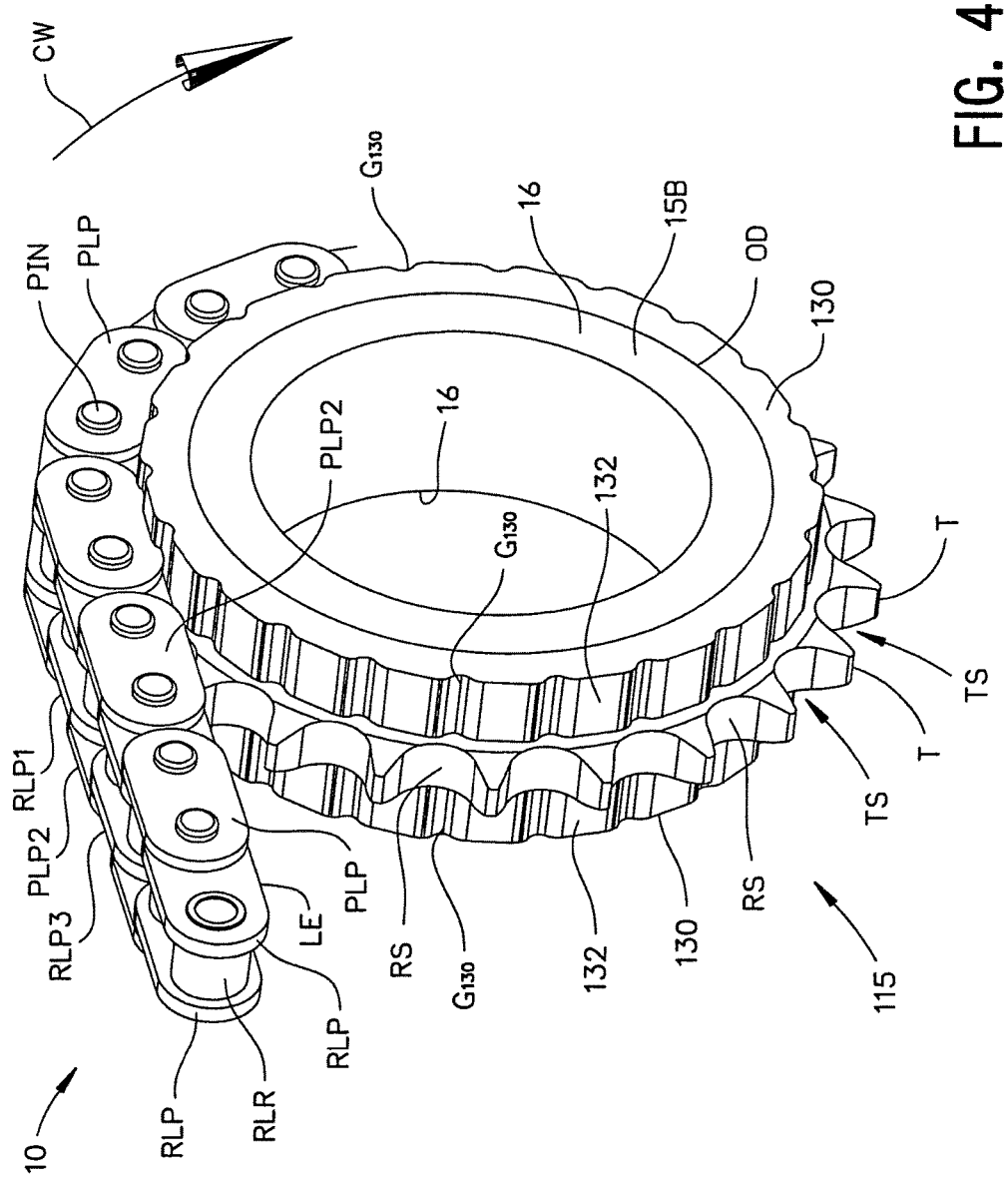
FIG. 4 is an isometric view of the conventional roller chain of FIG. 1 arranged in meshing engagement with a new and improved cushion ring sprocket formed according to a first embodiment of the present development.

According to the present development, a first embodiment of a new and improved cushion ring sprocket 115 is described with reference to FIGS. 4-5E. FIG. 4 shows a conventional roller chain 10 as described above in meshing engagement with the new and improved cushion ring sprocket 115. The cushion ring sprocket 115 comprises the metallic sprocket body 15B described above including the cylindrical hub 16 from which a row of outwardly projecting teeth T extend circumferentially around the hub 16. The teeth T are separated from each other by tooth spaces TS, each of which comprises and is partially defined by a root surface RS that extends between and interconnects circumferentially successive teeth T. The hub 16 projects or extends axially outward on opposite sides of the row of teeth T. Instead of the conventional elastomeric cushion rings 30, the sprocket 115 comprises first and second elastomeric cushion rings (CR) 130 formed in accordance with a first embodiment of the present development. Like components relative to the cushion rings 30 are identified with like reference numbers that are 100 greater than those used in FIGS. 1-3C.

The first and second elastomeric cushion rings 130 are respectively bonded to the outside diameter OD of the hub 16 on opposite first and second sides of the row of teeth T. The cushion rings 130 extend completely circumferentially around the outside diameter OD of the hub 16 and comprise alternating compression pads 132 and transverse, axially extending grooves $G_{130}$. The number of compression pads 132 and grooves $G_{130}$ included in each cushion ring 130 equals the number of teeth in the sprocket. The lower edges LE of the roller link plates RLP and the pin link plates PLP of the chain 10 make contact with—and compress—the pads 132 of cushion rings 130 during the meshing process to reduce the noise and vibration resulting from the contact of the chain rollers RLR with the sprocket.

Figure 5:
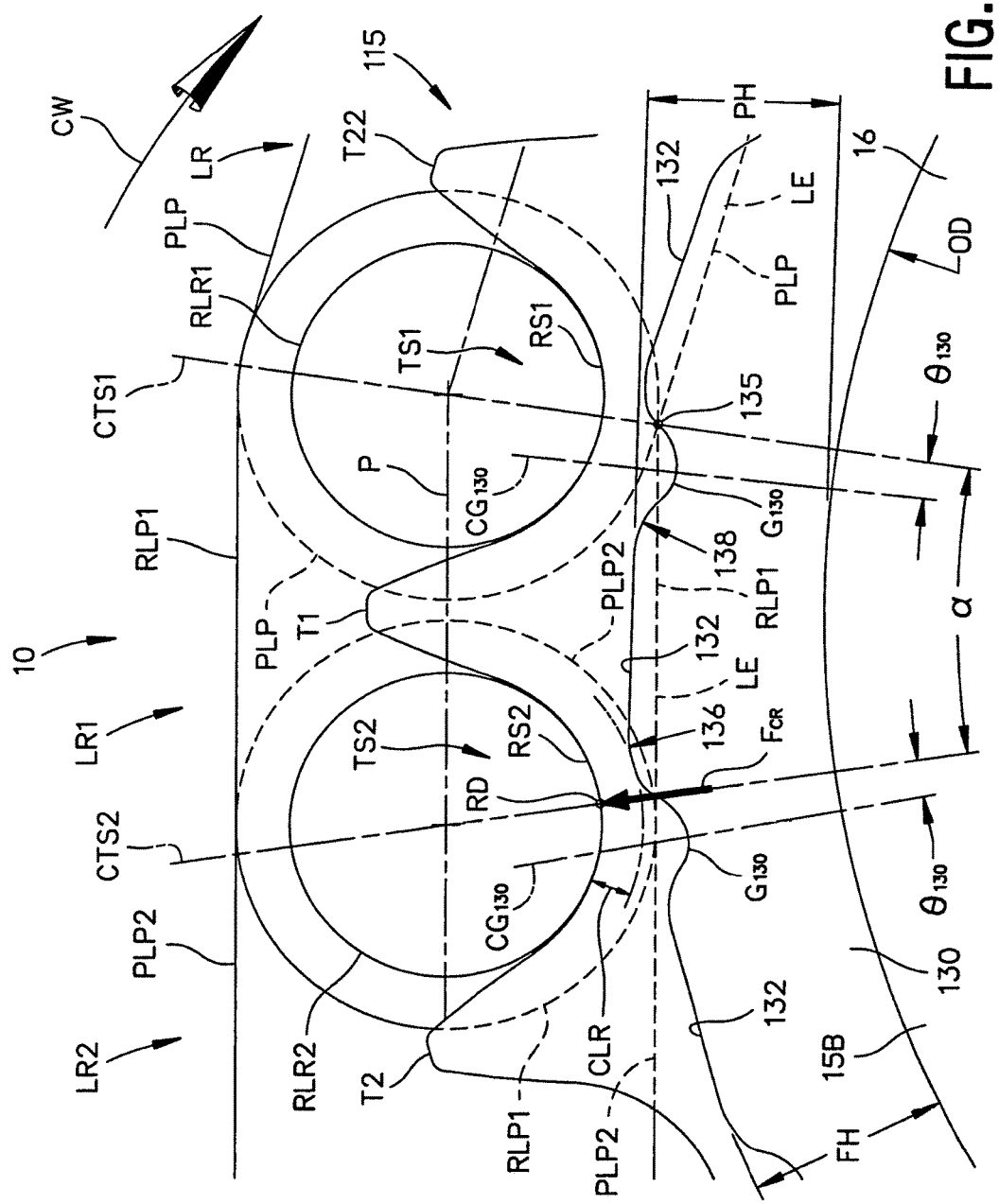
FIG. 5 is an enlarged partial view of the sprocket and chain of FIG. 4 that shows the chain link row LR1 in a fully meshed position relative to the sprocket with its leading roller RLR1 and a trailing roller RLR2 in fully seated positions in the respective sprocket tooth spaces TS1,TS2.

FIG. 5 shows the meshing chain link row LR1 which comprises a leading roller RLR1 and a trailing roller RLR2 located between first and second parallel, spaced-apart roller link plates RLP1. The leading roller RLR1 of the meshing link row LR1 is fully meshed with the sprocket 115, i.e., the leading roller RLR1 is fully seated in the tooth space TS1 and is in contact with the root surface RS1. The trailing roller RLR2 is shown at the instant when it completes its meshing process and becomes fully seated in the tooth space TS2 and in contact with the root surface RS2 at contact location RD. The trailing roller RLR2 is also the leading roller of the adjacent next-meshing or upstream chain link row LR2 that is shown at the instant when it is beginning its meshing sequence with the sprocket 115. The link row LR2 comprises the leading roller RLR2 and a trailing roller, both located between first and second parallel, spaced-apart pin link plates PLP2. The tooth spaces TS1,TS2 are symmetrical and comprise respective centerlines represented by respective reference lines CTS1,CTS2 (generally CTS) that originate at the center or axis of rotation of the sprocket 115 and that bisect the respective tooth spaces TS1,TS2. The centers of the fully meshed rollers RLR1, RLR2 are respectively located on the tooth space centerlines CTS1,CTS2. The sprocket 115 defines a chordal pitch that is theoretically equal to the chain pitch P at which the centers of the chain rollers RLR are spaced from each other.

The force vector $F_{CR}$ is a measure of the reaction damping force associated with the compression of the elastomeric cushion ring pads 132 by the chain link plates, and $F_{CR}$ acts collinear with tooth space centerline CTS2 at the meshing impact point RD for the trailing roller RLR2 of the meshing link row LR1. It should be appreciated that one of the essential tools for predicting the effectiveness and durability for known cushion ring design configurations as well as for new cushion ring patterns is to calculate the value of the damping force vector $F_{CR}$ using finite element analysis.

Figure 5A:
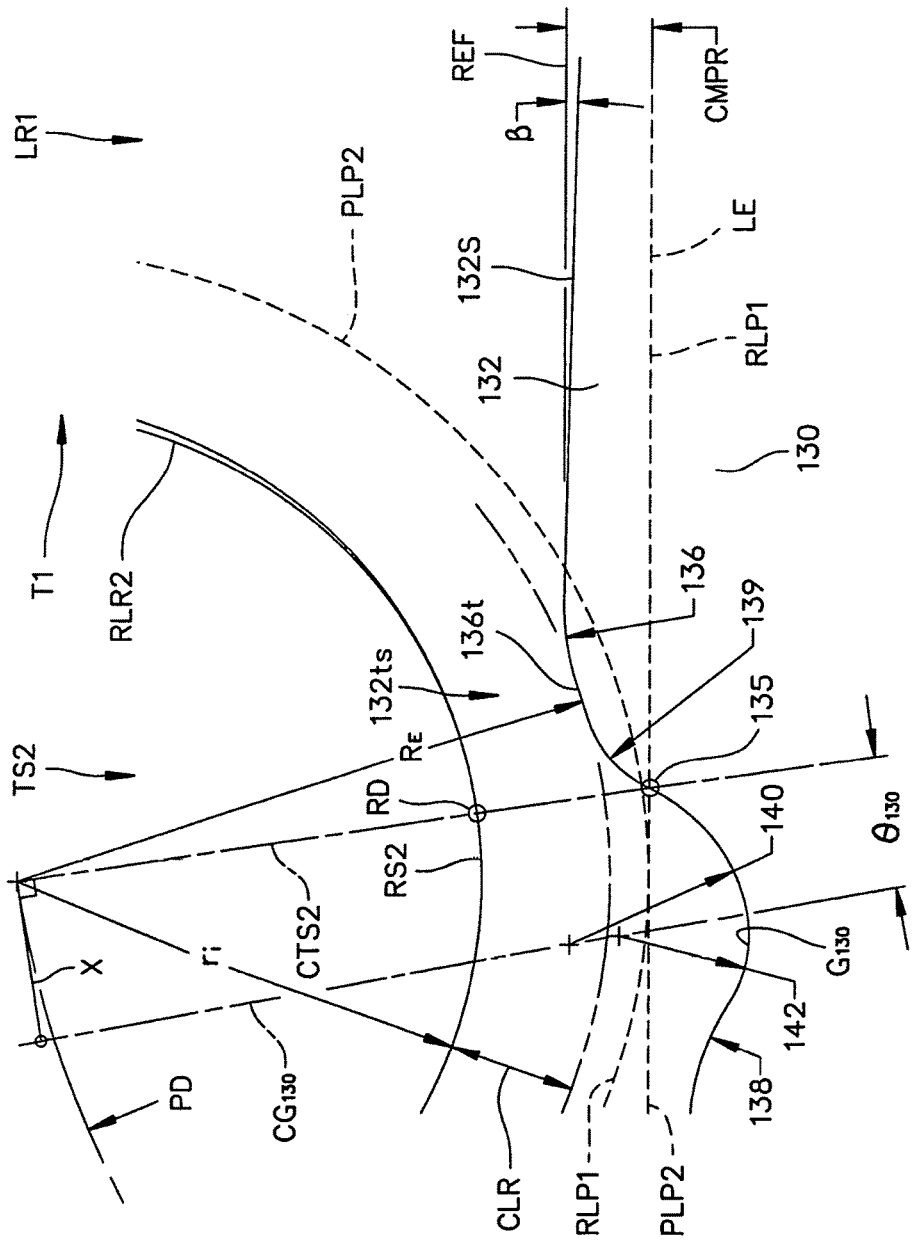
FIG. 5A is a greatly enlarged view of a portion of FIG. 5 showing the tooth space TS2 and the trailing roller RLR2 of the link row LR1 (which is the leading roller of the upstream, next-meshing link row LR2)
Figure 5B:
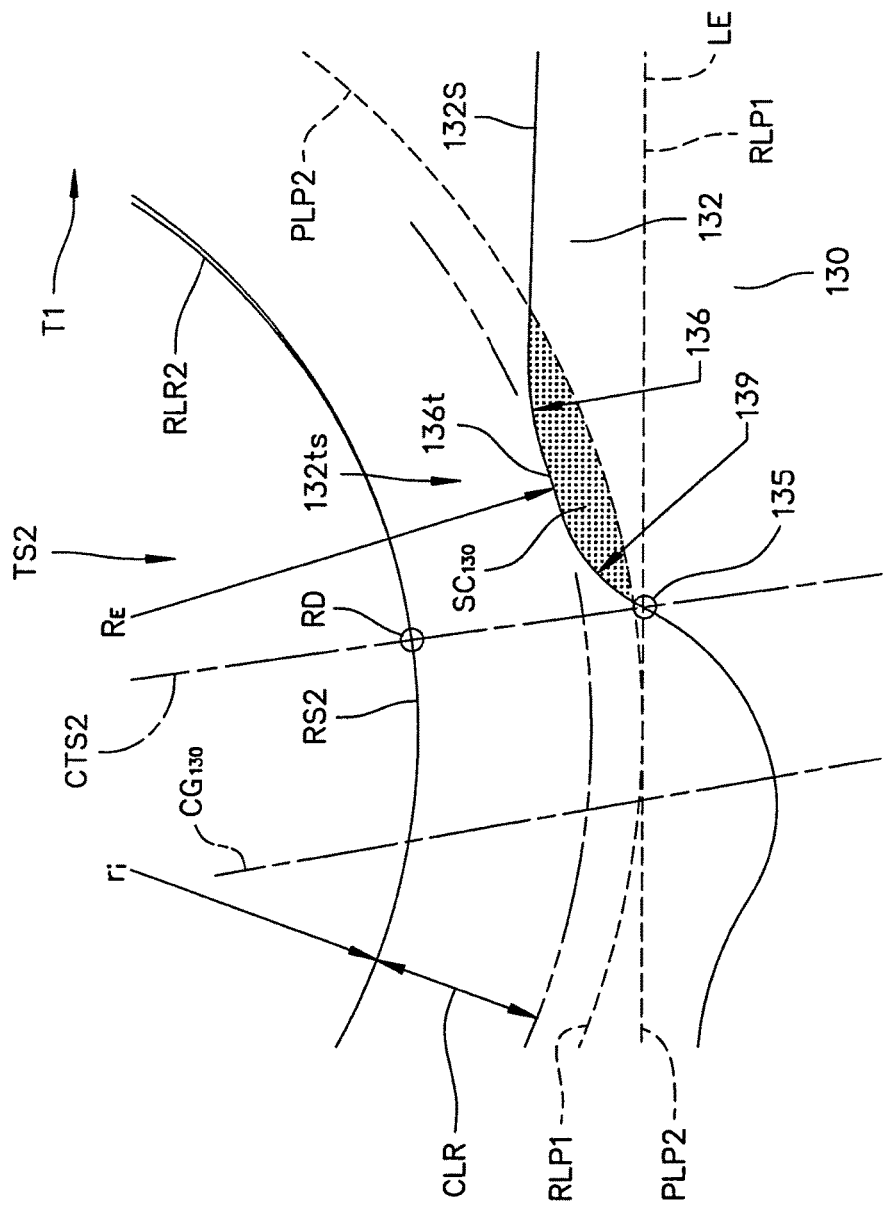
FIG. 5B corresponds with FIG. 5A but shows a shaded region to indicate secondary compression of the meshed link row compression pad 132 by chain links PLP2 of the upstream, next-meshing link row LR2.

FIG. 5A is a greatly enlarged view of a portion of FIG. 5 showing the tooth space TS2 and the trailing roller RLR2 of the link row LR1. It can be seen that the link plates RLP1 of the link row LR1 contact and compress the pad 132 located between the tooth spaces TS1,TS2 during the meshing rotation and the pad compression CMPR serves to beneficially diminish or soften the intensity of the meshing impact of the roller RLR2 with the root surface RS2. Like the sprocket 15, each groove $G_{130}$ is generally located radially inward from a respective associated tooth space TS of the sprocket but, unlike the sprocket 15, the centerline $CG_{130}$ of each groove $G_{130}$ is negatively angularly offset relative to the centerline of the respective tooth space TS, where "negatively angularly offset" means that the groove centerline $CG_{130}$ is moved angularly upstream in terms of the sprocket direction of rotation (opposite the direction of rotation of the sprocket). For example, as shown in FIGS. 5 & 5A, the centerlines $CG_{130}$ of the grooves $G_{130}$ associated with each tooth space TS1,TS2 are angularly offset from the respective tooth space centerline CTS1,CTS2 by a groove offset angle $\theta_{130}$, which has the same magnitude for each groove $G_{130}$ of each cushion ring 130. In FIGS. 5, 5A, and 5B (and in all corresponding drawing views of alternative embodiments described below) only one of the cushion rings 130 is visible, but it is noted that the cushion ring 130 located on the opposite side of the sprocket 115 is identically structured and arranged on the sprocket 115, with common structural features of the two cushion rings 130 angularly aligned with each other.

FIG. 5A shows the tooth space TS2, and all other tooth spaces TS of the sprocket are identically structured. The root surface RS2 (generally RS) is defined by a root radius $r_i$ that has its arc center located on the tooth space centerline CTS2. For each tooth space TS, a clearance radius $R_E$ has an arc center that is common with the arc center of the root radius $r_i$ but the clearance radius $R_E$ is larger than the root radius $r_i$ such that a clearance zone CLR for each tooth space is defined adjacent opposite first and second lateral sides of the teeth T by the region located between the root surface RS2 and the arc inscribed by the clearance radius $R_E$. The clearance zone CLR is devoid of and must not include any portion of the elastomeric material defining the cushion rings 130 in order for the cushion rings 130 to be molded onto the sprocket 115.

As shown in FIG. 5A, each groove $G_{130}$ of the cushion ring 130 is formed by a first or leading groove radius 140 that is connected to a second or trailing groove radius 142 where these radii are tangent with each other at their respective inner ends. The leading groove radius 140 and the trailing groove radius 142 comprise respective arc centers each located on the groove centerline $CG_{130}$.

FIGS. 5 & 5A also show that each compression pad 132 comprises an inclined planar or flat outer surface 132S that is contacted and compressed by the chain link plates RLP, PLP. A leading end of the compression pad outer surface 132S is connected to the preceding or downstream groove $G_{130}$ by a leading corner surface 138 defined by a radius that is tangent at one end (its outer or trailing end) to the compression pad outer surface 132S and that is tangent at the opposite end (its inner or leading end) to the outer end of the second groove radius 142. The trailing end of the compression pad outer surface 132S is joined to the trailing or upstream groove $G_{130}$ by a compound trailing corner surface 132ts comprising a first convex trailing corner surface 136, a concave transition surface 136t, and a second convex trailing corner surface 139, where the convex and concave surfaces are described as such with reference to the associated tooth space TS. An outer end of the trailing corner surface 132ts is joined to the compression pad outer surface 132S and an inner end of the trailing corner surface is joined to the upstream or trailing groove $G_{130}$. More particularly, the first trailing corner surface 136 is defined by a first corner radius that is tangent at one end to the compression pad outer surface 132S and is tangent at its opposite end to the transition surface 136t. The transition surface 136t comprises and is defined by a circular arc segment that follows an arcuate path defined by the clearance radius $R_E$. The second trailing corner surface 139 is defined by a second corner radius that is tangent at its outer end to the transition surface 136t and that is tangent at its inner end to the outer end of the first (leading) groove radius 140. As such, the transition surface 136t connects the first trailing corner surface 136 to the second trailing corner surface 139. The compound trailing surface 132ts comprising the first trailing corner surface 136, the transition surface 136t, and the second trailing corner surface 139, maximizes the size of the compression pad 132 without the compression pad 132 encroaching into the required clearance zone CLR which must remain free of the elastomeric material from which the cushion rings 130 are defined.

The outer surface 132S of each compression pad 132 is inclined in the illustrated embodiment. In particular, the planar surface 132S of each compression pad extends at an angle β (FIG. 5A) measured between the pad surface 132S on one side and, on the other side, a reference line REF that lies parallel to the lower edge LE of the involved fully meshed chain link plate RLP,PLP that engages the compression pad 132 or a plane tangent to the link plate lower edge LE at its midpoint if the lower edge is not a straight line (alternatively the reference line REF can be said to be parallel to the pitch chord of the sprocket for the tooth spaces TS1,TS2 involved with the meshing link row LR1). The incline of the outer surface 132S of each compression pad 132 can alternatively be measured relative to the radial reference line CT1,CT2 (generally CT) passing through the tooth center of the tooth T that lies adjacent the compression pad 132. Thus, the outer surface 132S of each compression pad 132 contacted by the lower edges LE of the chain link plates RLP,PLP is inclined such that minimum compression will occur in the proximity of the seated and pivoting leading roller RLR1, and maximum pad compression will beneficially occur in the proximity of the trailing meshing roller RLR2, where the compression CMPR will provide greater damping of meshing impact. The grooves $G_{130}$ provide voids or spaces for the elastomeric material forming the more highly-compressed trailing ends of the pads to move into during link row LR meshing and subsequent rotation through the sprocket wrap. In an alternative embodiment, the flat or planar surface 132S is non-inclined such that β=0°, in which case the compression of each compression pad 132 by the chain link plates RLP,PLP will be more evenly distributed between the leading and trailing ends of each pad 132. In a preferred embodiment, the incline angle β will be within the range of 0°≤β≤5°. Regardless of the incline angle β used, whether 0° or more, the sprocket 115 illustrated herein is constructed with each compression pad 132 being defined with the same incline angle β. In another alternative embodiment, the incline angle β is alternated between two different magnitudes with respect to circumferentially successive compression pads 132. In a timed system having a sprocket 115 with an even tooth count such that the position of the chain 10 relative to the sprocket 115 is known, this structure can be advantageous for increasing or decreasing the damping force provided by a particular compression pad 132. Alternating different incline angles β for circumferentially successive pads 132 allows the damping force to be increased or decreased depending upon whether a roller (inner) link plate row RLP or a pin (outer) link plate row PLP of the chain will engaging the compression pad 132, which can reduce undesired variations in the damping force and stress between circumferentially successive/adjacent compression pads 132.

Figure 1:
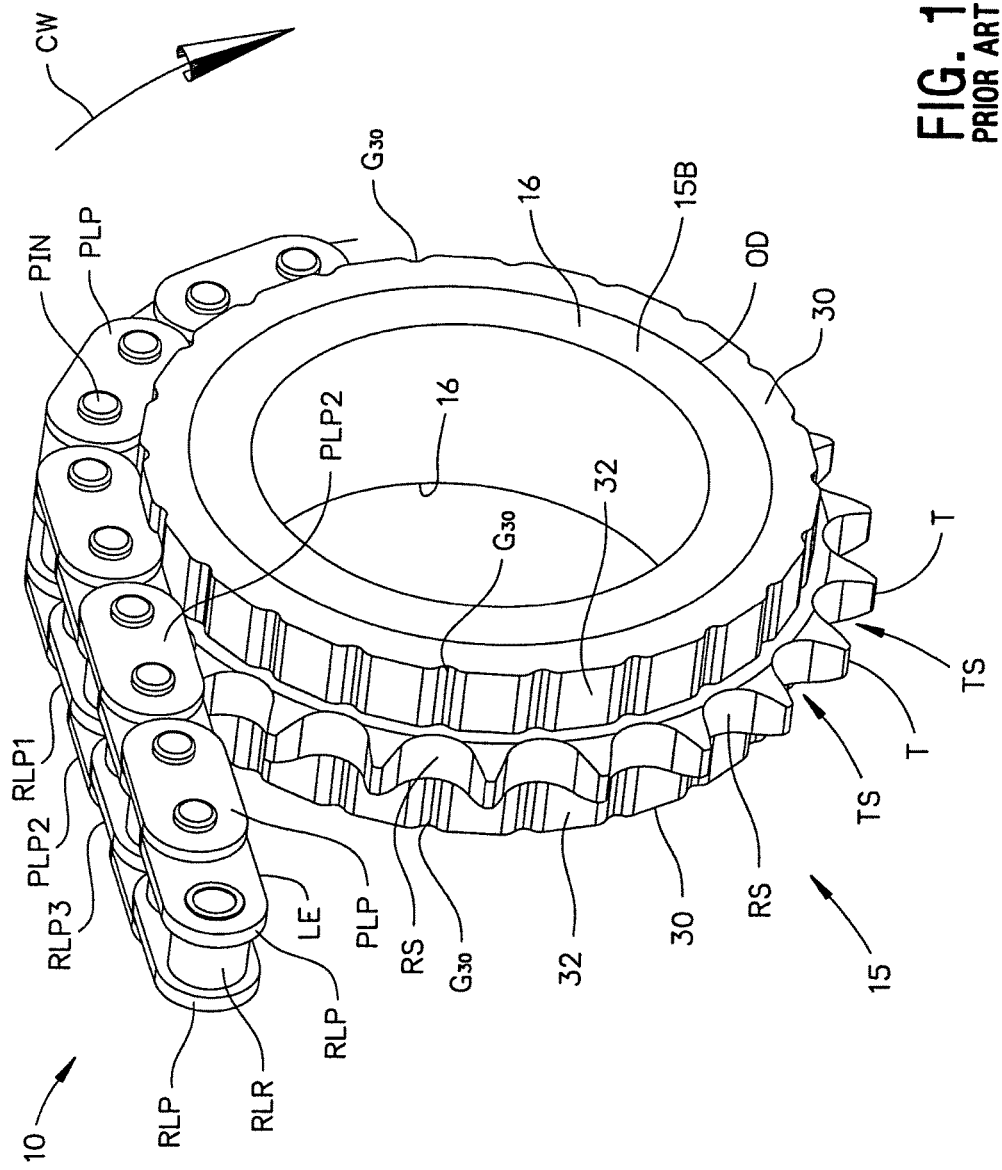
FIG. 1 is an isometric view of a conventional roller chain arranged in meshing engagement with an exemplary known roller chain sprocket having elastomeric cushion rings comprising nitrile rubber or the like bonded to a hub on each side of the sprocket.
Figure 2:
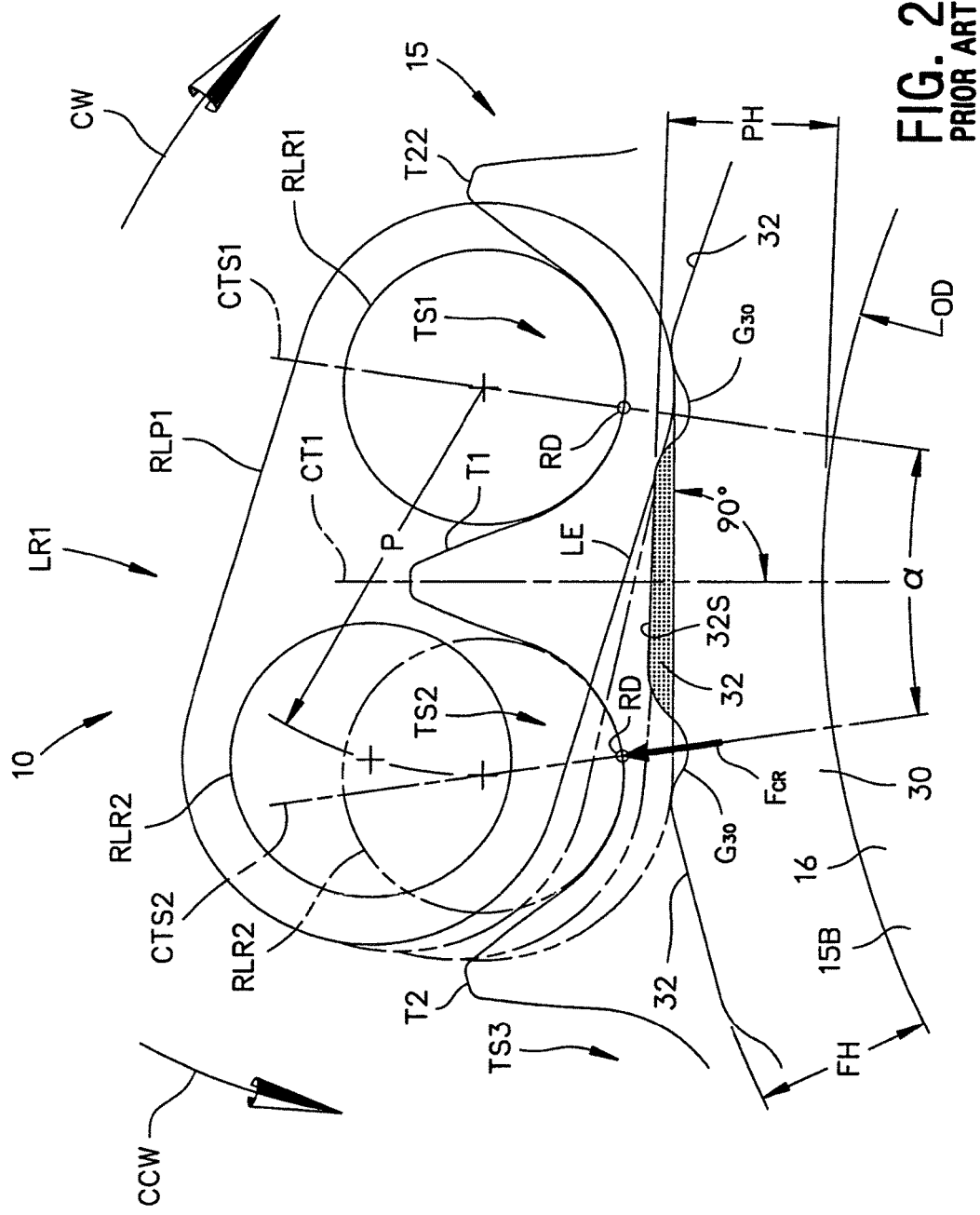
FIG. 2 is an enlarged partial view of the chain and sprocket of FIG. 1, showing a single row of the chain at several different positions of meshing progression with the chain link plate perimeter having a solid line at the meshing start position and phantom lines at the interim meshing positions and at the full meshing position.

In contrast to the known sprocket illustrated in FIG. 1, the centerline $CG_{130}$ of each groove $G_{130}$ is negatively angularly offset from the centerline CTS of the respective tooth space TS by an amount $\theta_{130}$ degrees, where negatively angularly offset means that the centerline $CG_{130}$ is moved angularly upstream relative to the centerline of CTS the adjacent tooth space TS. This has the effect of angularly shifting each compression pad 132 upstream in terms of the sprocket rotation direction. As compared to the known sprocket of FIG. 1, each compression pad 132 is shifted or translated upstream on a translation axis that lies parallel to the lower edge LE of the link plates RLP1,PLP2 of the respective fully meshed link rows LR1,LR2 for link plates with linear lower/inner edges (for a chain link plate with a non-linear lower edge, each compression pad 132 is shifted or translated upstream on a translation axis that lies parallel to a reference plane that lies tangent to the link plate lower edge LE at its midpoint). For the sprocket embodiment 115, the grooves $G_{130}$ are preferably angularly positioned on the sprocket 115 and the compression pads 132 are shifted upstream such that each tooth space centerline CTS (CTS1, CTS2) is circumferentially aligned with and intersects a location 135 of each cushion ring 130 on the trailing corner surface 132ts where the second trailing corner surface 139 is tangent to the first groove radius 140 in order to provide the benefits described below. The location where the second trailing corner surface 139 is tangent to the first groove radius 140 is considered to be part of the trailing corner surface 132ts. As such, a radially extending reference plane originating at the axis of rotation of the sprocket body 15B and coincident with the tooth space centerline CTS will intersect the cushion rings 130 at the locations 135.

As shown in FIG. 5, for a fully meshed link row LR1 and a preceding fully meshed link row LR, the lower edges LE of their respective link plates RLP1,PLP intersect at a vertex that is aligned with the location 135 where the tooth space centerline CTS1 intersects the compression pad 132.

FIGS. 5A and 5B show a primary compression or compression amount CMPR by which the chain link plates RLP1 of the fully meshed link row LR1 compress the involved pad 132 that is located between the tooth spaces TS1,TS2 in which the leading and trailing rollers RLR1,RLR2 of the fully meshed link row LR1 are respectively received). In addition and unlike the sprocket of FIG. 1, the chain link plates PLP2 of the next meshing (upstream) link row LR2 also contact and compress the same compression pad 132 located between the first and second tooth spaces TS1,TS2 by a secondary compression amount indicated by the shaded area $SC_{130}$ of FIG. 5B simultaneously with the primary compression CMPR of the pad 132 by the chain links RLP1 of the meshing link row LR1.

FIGS. 5C and 5D show plan views of the compression footprint of the link plates RLP,PLP at their respective full meshing engagement positions. FIG. 5C corresponds to the sprocket position of FIG. 5 and shows the roller link plate primary compression footprints $RL1PC_{130}$ made in each compression pad 132 on opposite sides of the tooth T1 corresponding to the primary compression CMPR caused by the link row LR1. FIG. 5C also shows that the same compression pads 132 located adjacent the opposite lateral sides of the tooth T1 are compressed with secondary compression at their trailing ends by the leading end of the chain link plates PLP2 of the next-meshing upstream chain link row LR2 as indicated by the shaded regions $PL2SC_{130}$. FIG. 5D shows the sprocket 115 rotated one tooth angle to the point where the next link row LR2 is fully meshed with the sprocket 115 and shows the (thinner) pin link plate compression footprint $PL2PC_{130}$ made in each compression pad 132 located adjacent the opposite sides of the tooth T2 for the link row LR2 corresponding to the primary compression CMPR caused by the link row LR2. FIG. 5D also shows that the same compression pads 132 are compressed with secondary compression at their trailing ends by the leading end of the chain link plates RLP3 of the next-meshing upstream chain link row LR3 as indicated by the shaded regions $RL3SC_{130}$. In both FIGS. 5C and 5D, it can be seen that the compression pads 132 corresponding to the meshing link row of the chain are compressed primarily by the chain link plates of the meshing link row as indicated by the shaded regions $RL1PC_{130}$ (FIG. 5C) and $PL2PC_{130}$ (FIG. 5D), but the same compression pads 132 are also compressed with secondary compression at their trailing ends by the leading end of the chain link plates of the next-meshing upstream chain link row as indicated by the shaded regions $PL2SC_{130}$ (FIG. 5C) and $RL3SC_{130}$ (FIG. 5D). This additional secondary compression $PL2SC_{130}$ and $RL3SC_{130}$ of the compression pads 132 by the next-meshing (upstream) link row LR2,LR3 provides additional damping for the trailing roller of the meshing link row LR1,LR2 and does so without undesirably increasing the depth of primary compression CMPR of the compression pad 132 which can reduce the durability of the pad 132. Also, in comparing FIGS. 3B and 5C, it can be seen that the angular offset $\theta_{130}$ of the cushion rings 130 and upstream shifting or translation of the compression pads 132 as compared to the known cushion rings 30 and compression pads 32 results in a corresponding beneficial shift of the meshing row link plate compression footprint from the location of $RL1C_{30}$ (FIG. 3B) to the location $RL1PC_{130}$ (FIG. 5C) that is closer to the root diameter contact location RD of the trailing roller of the meshing link row, which indicates that the trailing end of the compression pads 132 are beneficially located relative to the sprocket tooth spaces TS where they can provide increased damping for the trailing roller as it makes meshing impact at the location RD. The same beneficial shift in the compression footprint can be seen by comparing FIGS. 3C and 5D and the location of the compression footprint $PL2C_{30}$ (FIG. 3C) with the compression footprint $PL2PC_{130}$ (FIG. 5D). Accordingly, the structure and arrangement of the cushion rings 130 provides secondary compression $SC_{130}$ and also locates the compression pad 132 closer to the root diameter contact location RD of the trailing roller of the meshing link row, both of which factors increase the magnitude of the compression pad reaction/damping force vector $F_{CR}$ which provides additional damping of the chain meshing process for a given depth of compression (and stress exerted on) of the compression pads 132.

Figure 5E:
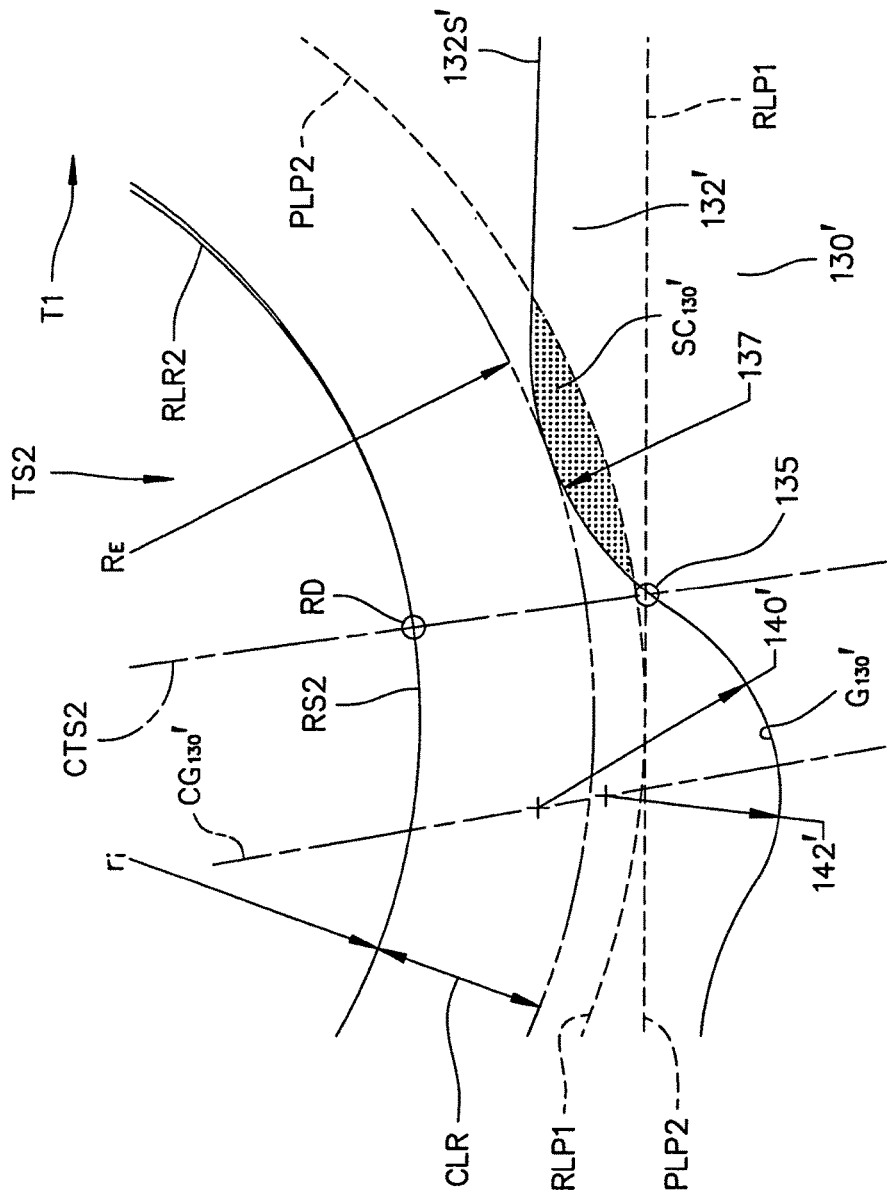
FIG. 5E is similar to FIG. 5B but shows an alternative embodiment for the structure of the trailing end of each compression pad of the cushion rings.

In an alternative embodiment shown in FIG. 5E, the cushion rings 130 can each be modified to provide a cushion ring 130' that is identical to the cushion ring 130 except as shown and/or described herein. Like structures and/or features of the modified cushion ring 130' relative to the cushion ring 130 are indicated in FIG. 5E with like reference characters including a primed (') suffix. The compression pads 132' of the cushion ring 130' are modified relative to the compression pads 132 of the cushion ring 130 such that the trailing end of the compression pad outer surface 132S' is connected to the adjacent trailing or upstream groove $G_{130}$' by a trailing corner surface 137 defined by a radius that is tangent at one end (its outer or leading end) to the compression pad outer surface 132S' and that is tangent at the opposite end (its inner or trailing end) to the first groove radius 140'. The radius of the trailing corner surface 137 is dimensioned so that the trailing corner surface 137 is tangent to the clearance radius $R_E$ to ensure that no part of the compression pad 132' extends into the clearance zone CLR so that the clearance zone CLR remains free of the elastomeric material from which the cushion ring 130' is defined. In the embodiment illustrated in FIG. 5E, the angular offset $\theta_{130}$ of the groove $G_{130}$' is equal to the angular offset $\theta_{130}$ of the groove $G_{130}$. The cushion rings 130' are angularly situated on the sprocket body 15B such that each tooth space centerline CTS (CTS2) is circumferentially aligned with the location 135 where the trailing corner surface 137 is tangent to the first or leading groove radius 140' such that a radially extending reference plane originating at the axis of rotation of the sprocket body 15B and coincident with the tooth space centerline CTS will intersect the cushion rings 130 at the locations 135. As noted above, the location 135 where the trailing corner surface 137 is tangent to the first or leading groove radius 140' is considered to be part of the trailing corner surface 137. The structure of the compression pad 132' eliminates the concave transition surface 136t of the compression pad 132 to simplify the trailing end of each compression pad 132' while still providing substantially the same primary compression CMPR and secondary compression $SC_{130}$' as the cushion ring 130.

Figure 6:
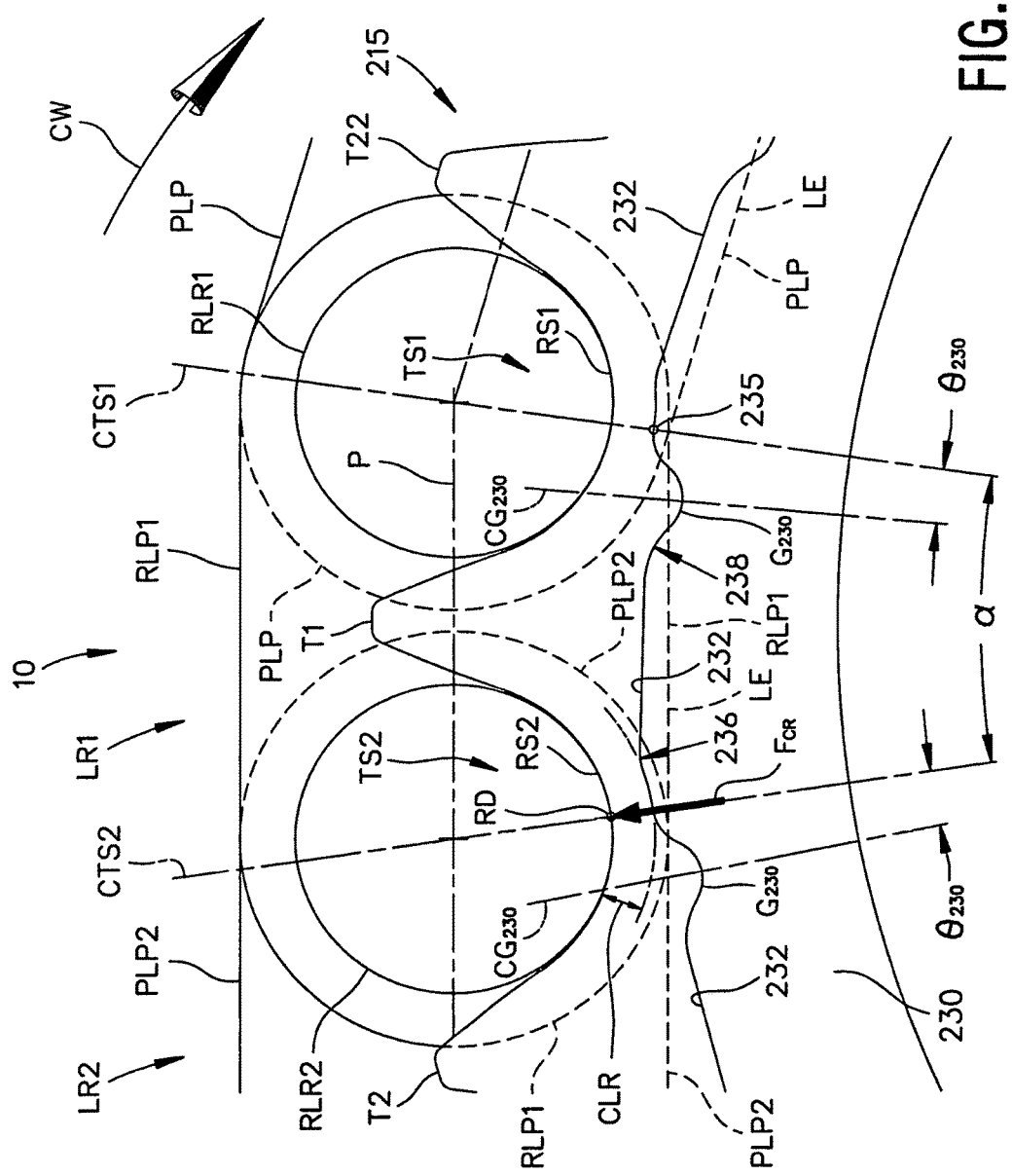
FIG. 6 is an enlarged partial view that is similar to FIG. 5, but shows an alternative structure of the cushion rings and compression pads for use on the sprocket body of FIG. 4.

FIGS. 6-6D correspond respectively to FIGS. 5-5D, but show another alternative embodiment of a sprocket 215 formed in accordance with the present development. Except as otherwise shown in the drawings and/or described herein, the 215 is identical to the sprocket 115, and structures of the sprocket 215 that correspond to structures of the sprocket 115 are labeled with reference numbers that are 100 greater than those used for the sprocket 115. The sprocket 215 differs from the sprocket 115 with respect to the magnitude of the groove offset angle $\theta_{230}$ by which the grooves $G_{230}$ are negatively offset relative to the tooth space centers CTS1, CTS2 and the magnitude of the upstream shifting or translation of the compression pads 232 of the sprocket 215 as compared to the compression pads 132 of the sprocket 115.

In particular, the groove offset angle $\theta_{230}$ is greater (more negatively offset) for the sprocket 215 as compared to the sprocket 115, and each compression pad 232 is shifted or translated upstream on a translation axis that lies parallel to the lower edge LE of the link plates RLP1,PLP2 of the respective fully meshed link rows LR1,LR2 (and parallel to the sprocket pitch chord) by a magnitude that is greater than the corresponding upstream shifting or translation of the pads 132 of the sprocket 115. As such, the tooth space centerline CTS1,CTS2 is circumferentially aligned with and intersects each cushion ring 230 at a location 235 where the transition surface 236t is tangent to the second trailing corner surface 239. Accordingly, a radially extending reference plane originating at the axis of rotation of the sprocket body 15B and coincident with the tooth space centerline CTS will intersect each cushion rings 230 at location 235. This increase in the groove offset angle $\theta_{230}$ magnitude as compared to the groove offset angle $\theta_{130}$ and the additional upstream translation of the compression pads 232 as compared to the position of the compression pads 132 beneficially locates the elastomeric material of the compression pad 232 closer to and more directly beneath (more radially aligned with) the trailing roller RLR2 of the meshing link row LR1, and also increases the secondary compression $SC_{230}$ of the compression pads 232 by the leading ends of the link plates PLP2 of the next-meshing (upstream) link row LR2 of the chain 10, so as to provide additional damping of the chain meshing process for a given depth of compression of the compression pads 132. A comparison of FIGS. 5C/5D with FIGS. 6C/6D further shows that the increase in the magnitude of the groove offset angle $\theta_{230}$ as compared to the groove offset angle $\theta_{130}$ and the additional upstream translation of the compression pads 232 as compared to the position of the compression pads 132 results in a further beneficial upstream shift of the roller link plate primary compression footprint indicated by the shaded regions $RL1PC_{230}$ (FIG. 6C for link row LR1) and $PL2PC_{230}$ (FIG. 6D for link row LR2) closer to the root diameter contact location RD of the trailing roller of the meshing link row, which indicates that the trailing end of the compression pad 232 is located relative to the sprocket tooth space where it can provide increased damping for the trailing roller of the meshing link row as the trailing roller makes contact at the location RD. Similarly, the increase in the magnitude of the groove offset angle $\theta_{230}$ as compared to the groove offset angle $\theta_{130}$ and the additional upstream translation of the compression pads 232 as compared to the position of the compression pads 132 results in a further beneficial shift of the roller link plate secondary compression footprint indicated by the shaded regions $PL2SC_{230}$ (FIG. 6C) and $RL3SC_{230}$ (FIG. 6D) closer to the root diameter contact location RD of the trailing roller of the meshing link row, which indicates that the trailing end of the compression pad 232 is located relative to the sprocket tooth spaces where it can provide increased damping (via secondary compression $SC_{230}$) for the trailing roller of each meshing link row as the trailing roller makes contact at the location RD.

Figure 3:
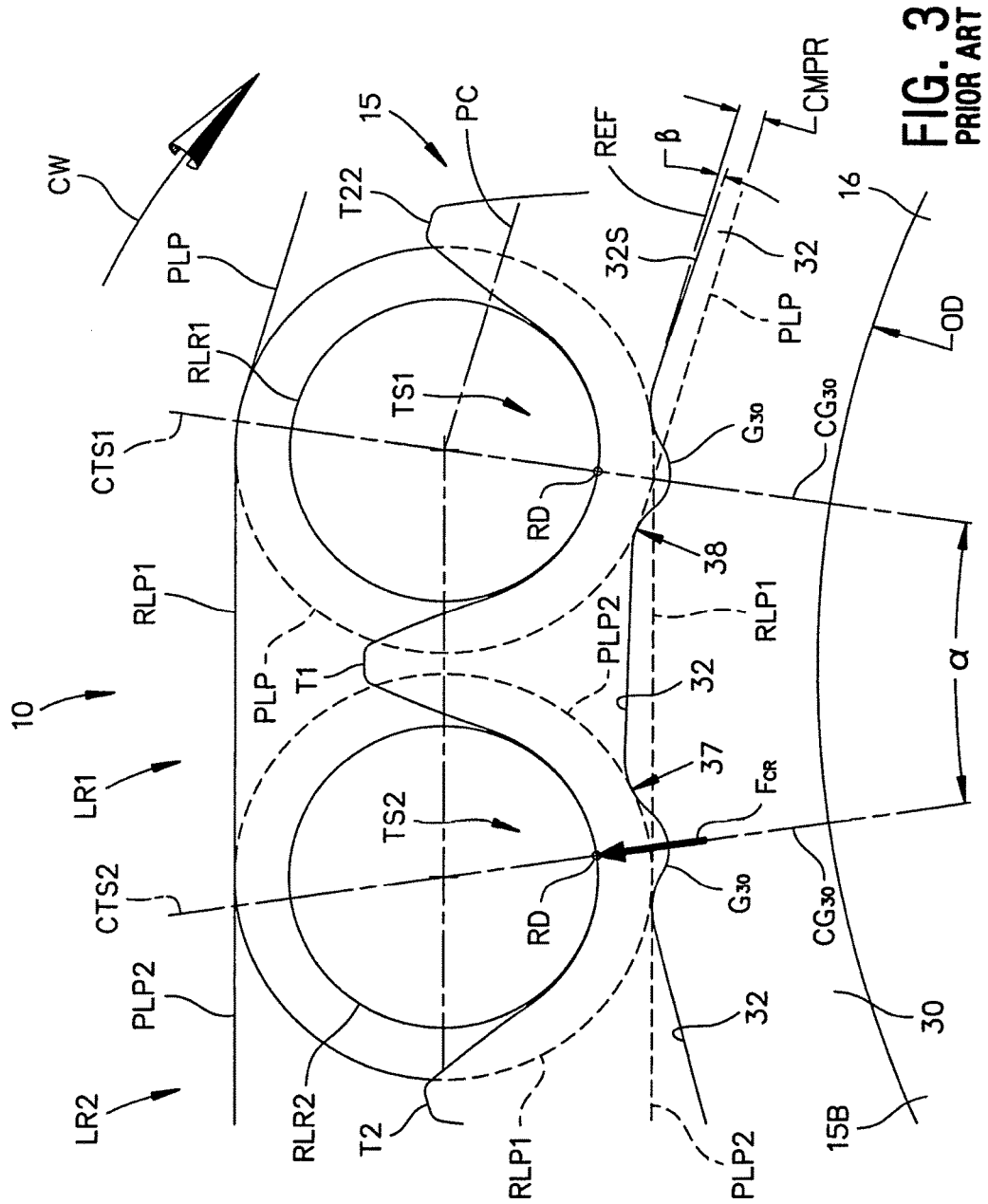
FIG. 3 is similar to FIG. 2, but shows the single link row LR1 of FIG. 2 in its fully meshed position, and also shows a preceding (downstream) fully meshed link row and a next-meshing (upstream) link row LR2.
Figure 3A:
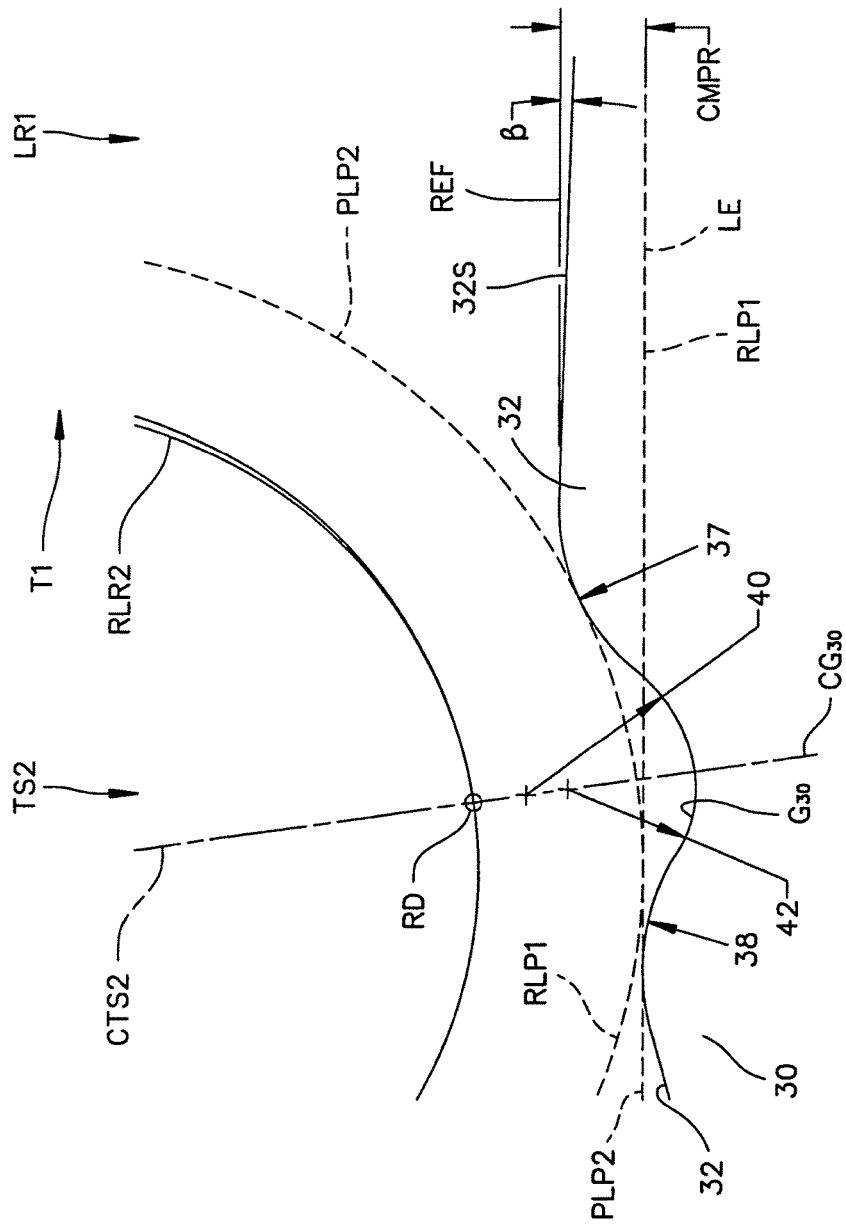
FIG. 3A shows a greatly enlarged portion of FIG. 3.
Figure 6A:
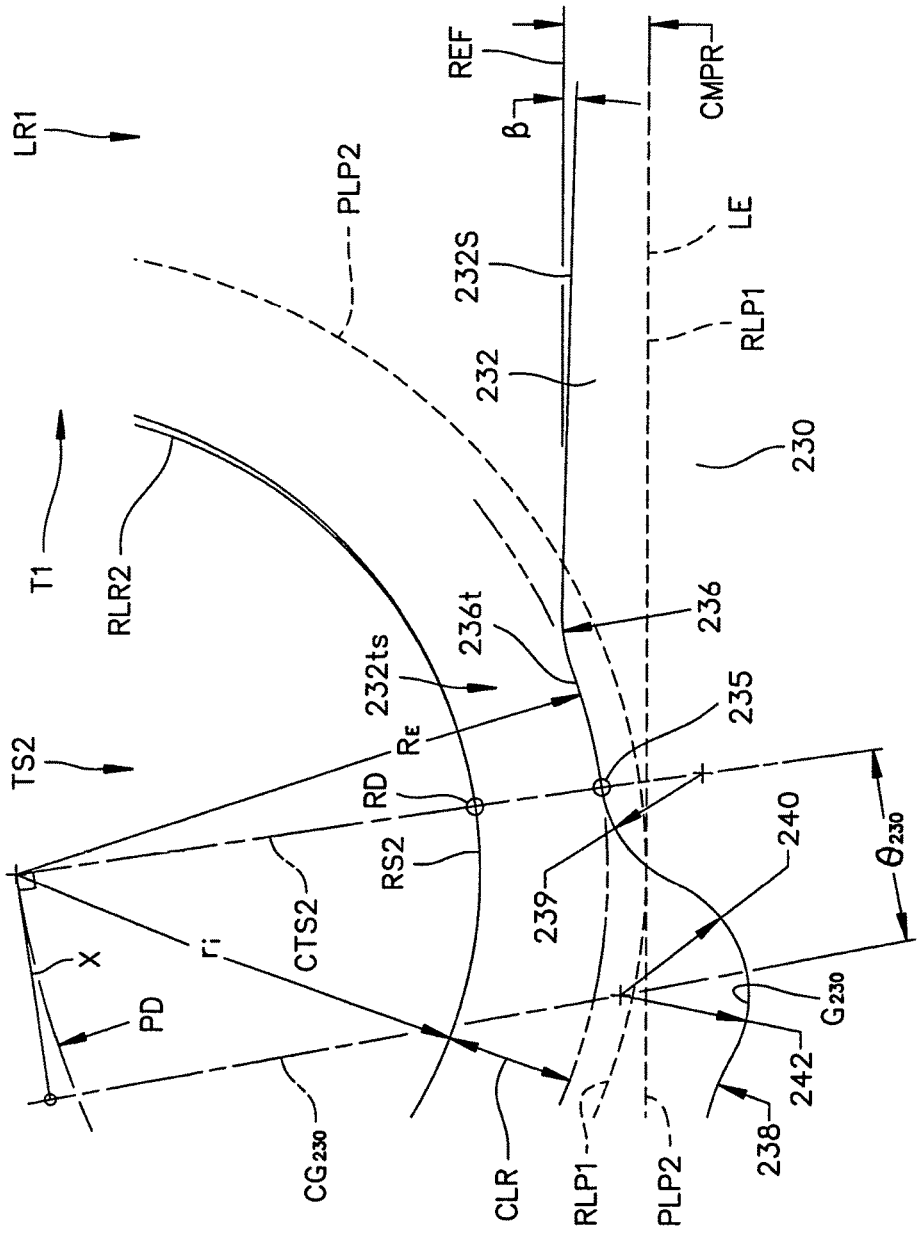
FIG. 6A is a greatly enlarged view of a portion of FIG. 6 showing the tooth space TS2 and the trailing roller RLR2 of the link row LR1 (which is the leading roller of the upstream, next-meshing link row LR2)
Figure 6B:
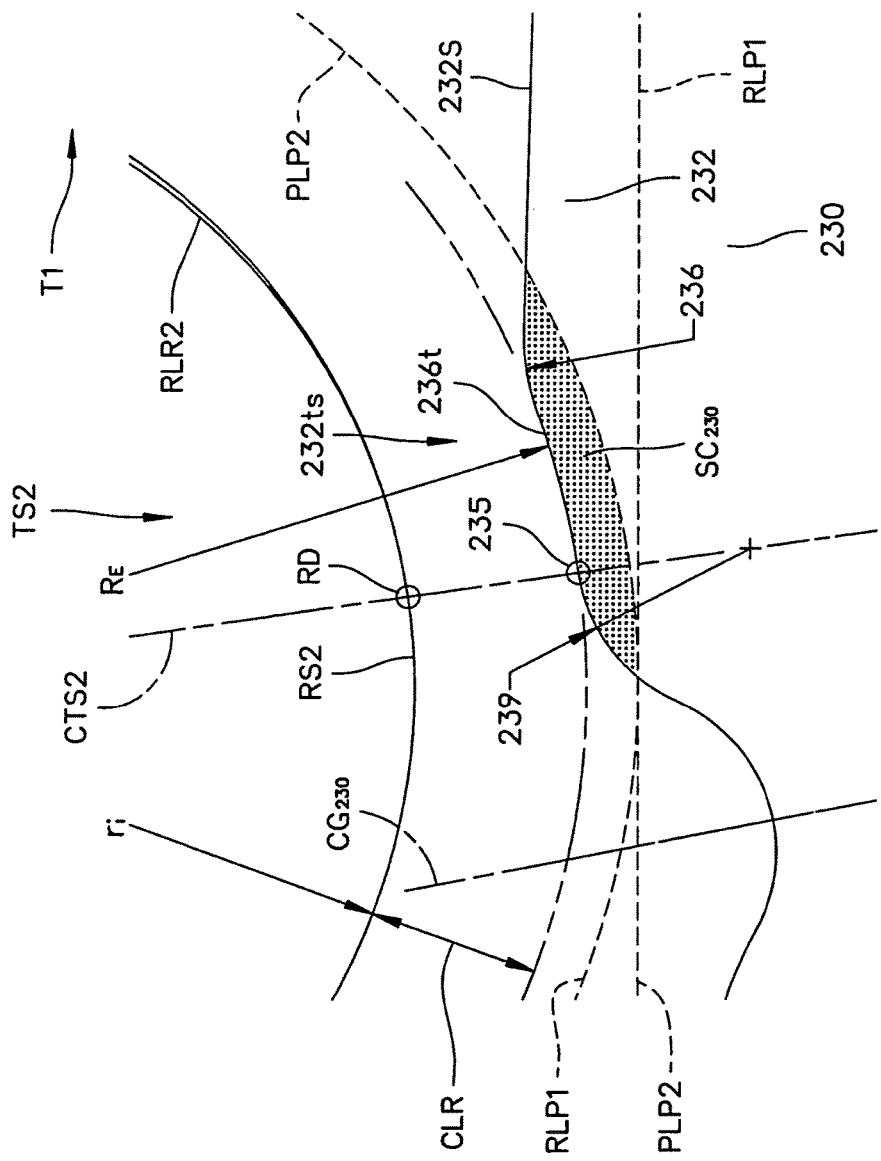
FIG. 6B corresponds with FIG. 6A but shows a shaded region to indicate secondary compression of the meshed link row compression pad 232 by chain links PLP2 of the upstream, next-meshing link row LR2.
Figure 7A:
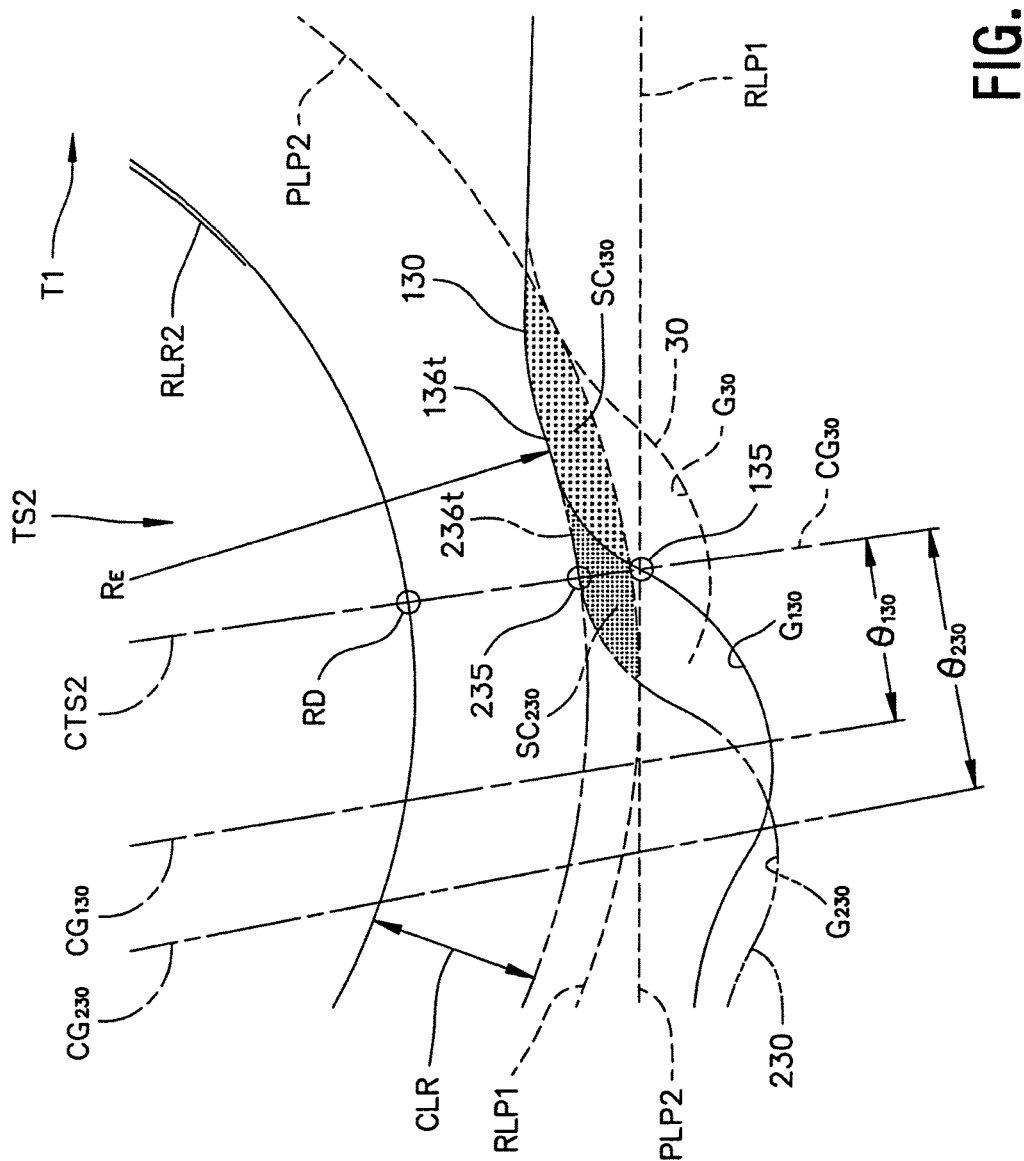
FIG. 7A corresponds to FIG. 6B but also overlays corresponding views of the prior art design of FIG. 3A (shown in dashed lines) and the embodiment of FIG. 5A (shown in phantom lines) to facilitate a comparison.

FIG. 7A corresponds to FIG. 6B but also overlays corresponding views of the prior art cushion ring design 30 of FIG. 3A (shown in dashed lines) and the cushion ring embodiment 130 of FIG. 5A (shown in phantom lines) to facilitate a comparison. It can be seen that the prior art cushion ring design 30 of FIG. 3A does not provide any secondary compression (the compression pad 32 is not contacted by the leading end of the chain links PLP2 of the upstream, next meshing link row). In contrast, both the cushion ring embodiments 130 and 230 provide such secondary compression as indicated respectively at $SC_{130}$ and $SC_{230}$ (note that the shaded region $SC_{230}$ also includes the shaded region $SC_{130}$).

Figure 7B:
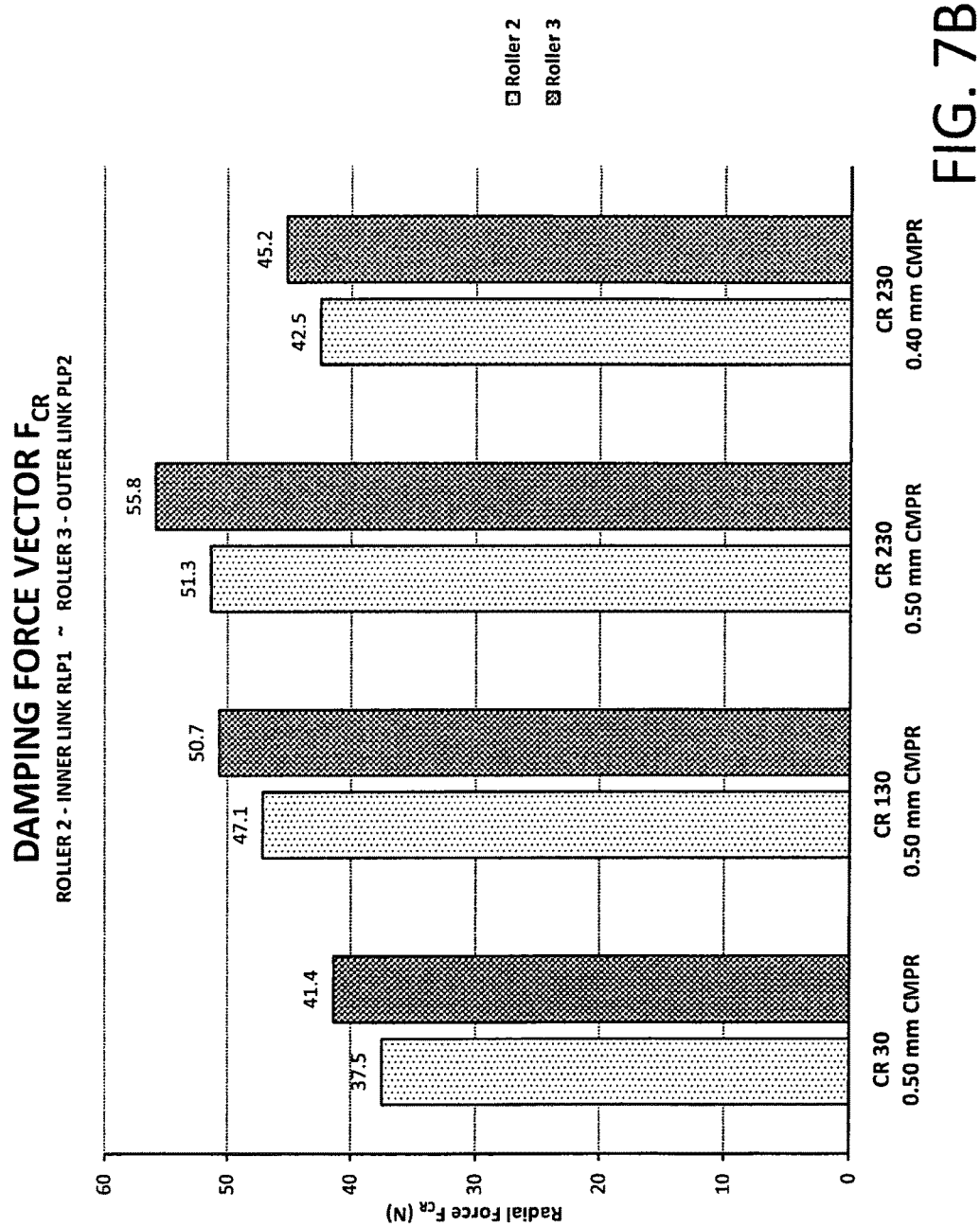
FIG. 7B is a bar graph that provides a comparison of the damping force vector $F_{CR}$ for the prior art design of FIG. 3, the embodiment of FIG. 5, and the embodiment of FIG. 6 (two different pad compression levels are shown for the FIG. 6 embodiment)

FIG. 7B is a bar graph that provides a (finite element analysis (FEA)) comparison of the damping force vector $F_{CR}$ for the prior art cushion ring design 30, the cushion ring embodiment 130, and the cushion ring embodiment 230 (two different pad compression levels are shown for the FIG. 6 embodiment, where the pad compression level depends upon the maximum height of the compression pad 232 relative to the hub 16 or axis of rotation of the sprocket 215. It can be seen that for the trailing roller RLR 2 (labeled as "Roller 2") and for the trailing roller RLR3 (labeled as "Roller 3") of the respective meshing link rows LR2 and LR3, all of the cushion ring embodiments 130 and 230 of the present application provide a significantly increased magnitude damping force vector $F_{CR}$ as compared to the conventional cushion ring 30.

Table 1 provides the damping force vector $F_{CR}$ and associated Von Mises stress levels for the prior art cushion ring 30, and the cushion ring embodiments 130, 230 of the present application. It can be seen that the cushion ring embodiments 130, 230 of the present application provide for a much greater magnitude damping force vector $F_{CR}$ with substantially the same or less stress exerted on the compression pads 132,232. Table 1 verifies that translating the elastomeric material of the compression pads 132,332 closer to—and under—the meshing roller serves to enhance the damping (thereby improving NVH) as illustrated in both the Table and FIG. 7B with no significant increase (and in all but one case a decrease) in the related Von Mises stress level.

TABLE 1

Damping Force Vector $F_{CR}$ and Related Von Mises Stress
8-mm Pitch Roller Chain and 22T Sprockets

| CR STYLE | CMPR (mm) | Groove Offset θ° | RLP1 INNER LINKS | | PLP2 OUTER LINKS | |
| --- | --- | --- | --- | --- | --- | --- |
| | | | $F_{CR}$ (N) | VM (MPa) | $F_{CR}$ (N) | VM (MPa) |
| 30 (FIG. 3) | 0.50 | — | 37.5 | 2.40 | 41.4 | 3.41 |
| 130 (FIG. 5) | 0.50 | 2.0 | 47.1 | 2.42 | 50.7 | 3.29 |

TABLE 1-continued

Damping Force Vector $F_{CR}$ and Related Von Mises Stress
8-mm Pitch Roller Chain and 22T Sprockets

| CR STYLE | CMPR (mm) | Groove Offset θ° | RLP1 INNER LINKS | | PLP2 OUTER LINKS | |
|---|---|---|---|---|---|---|
| | | | $F_{CR}$ (N) | VM (MPa) | $F_{CR}$ (N) | VM (MPa) |
| 230 (FIG. 6) | 0.50 | 3.0 | 51.3 | 2.31 | 55.8 | 3.34 |
| 230 (FIG. 6) | 0.40 | 3.0 | 42.5 | 1.74 | 45.2 | 2.51 |

Figure 8:
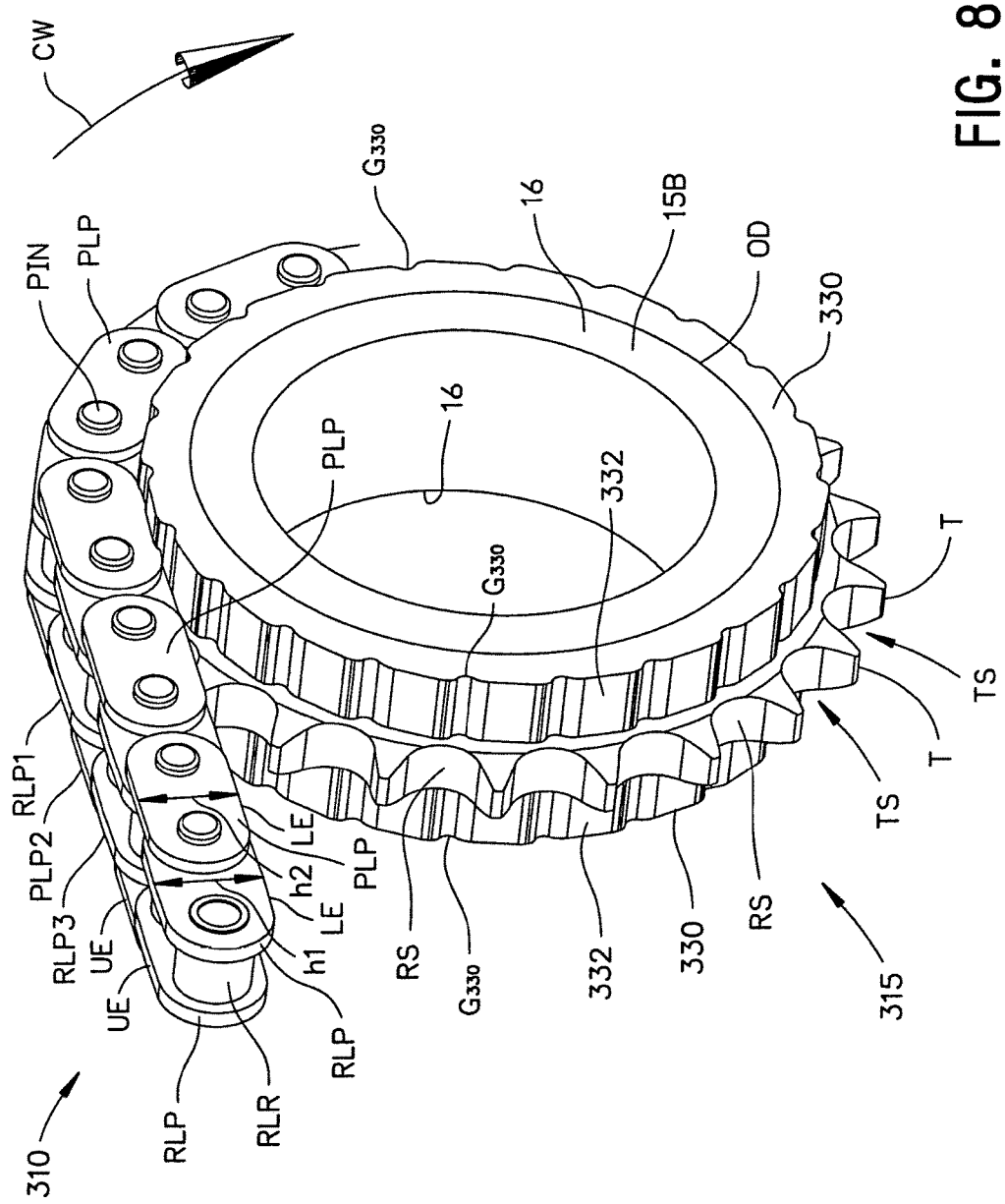
FIG. 8 is an isometric view of a second type of conventional roller chain with alternating different link plate heights arranged in meshing engagement with a new and improved cushion ring sprocket formed according to a fourth embodiment of the present development.
Figure 9:
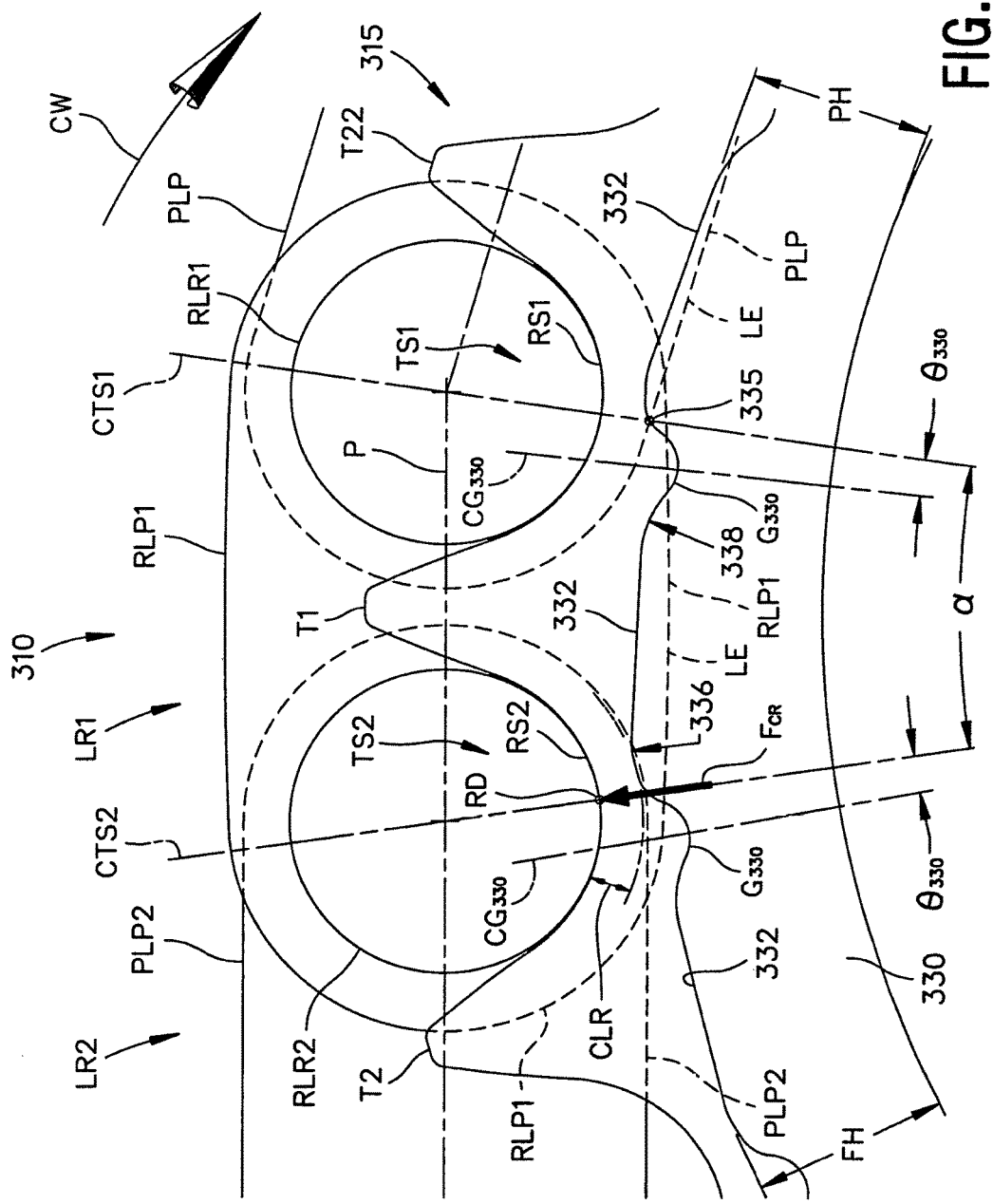
FIG. 9 is an enlarged partial view of the sprocket and chain of FIG. 8 that shows the chain link row LR1 (with larger height link plates) in a fully meshed position relative to the sprocket with its leading roller RLR1 and a trailing roller RLR2 in fully seated positions in the respective sprocket tooth spaces TS1,TS2.
Figure 9A:
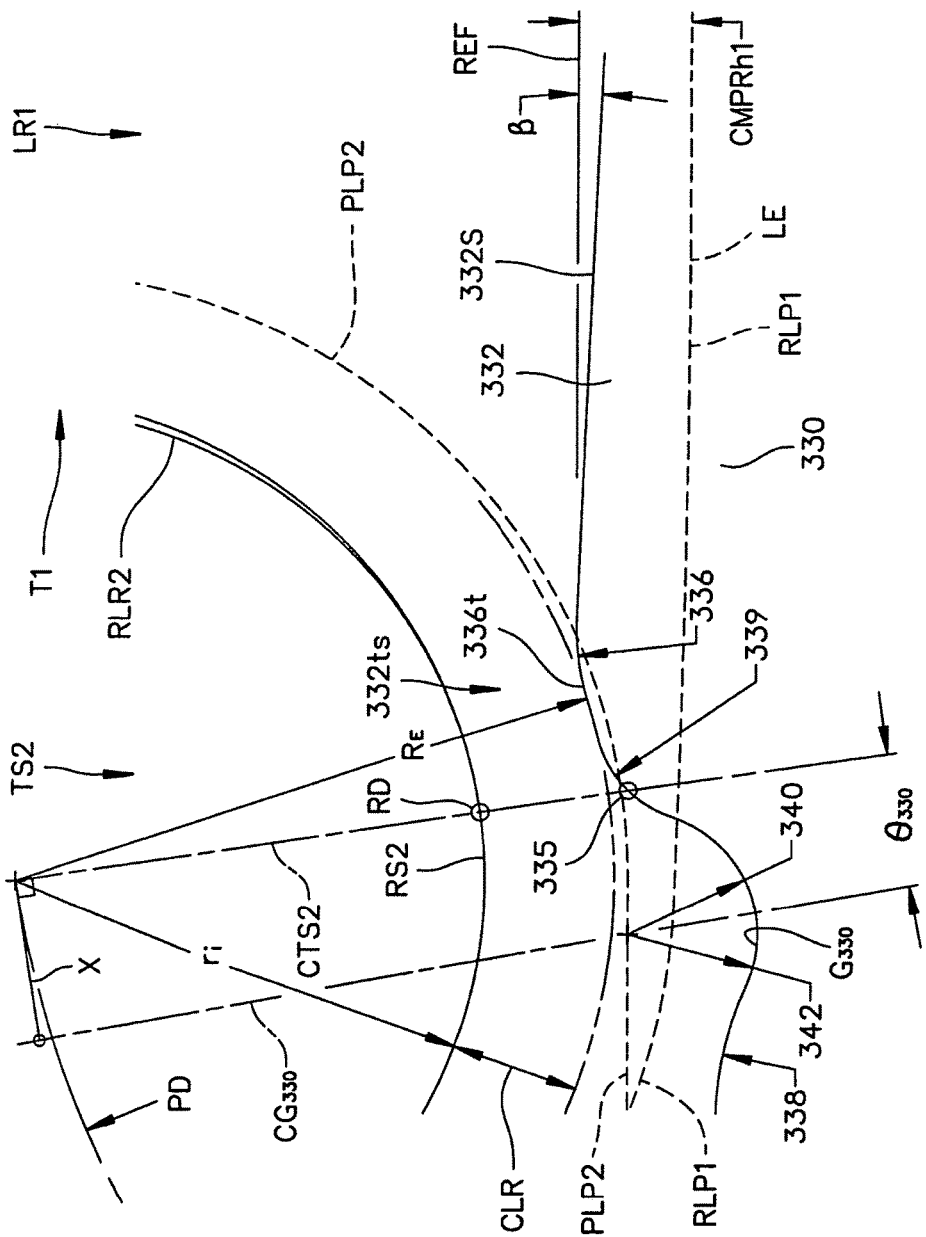
FIG. 9A is a greatly enlarged view of a portion of FIG. 9 showing the tooth space TS2 and the trailing roller RLR2 of the link row LR1 (which is the leading roller of the upstream, next-meshing link row LR2)
Figure 9B:
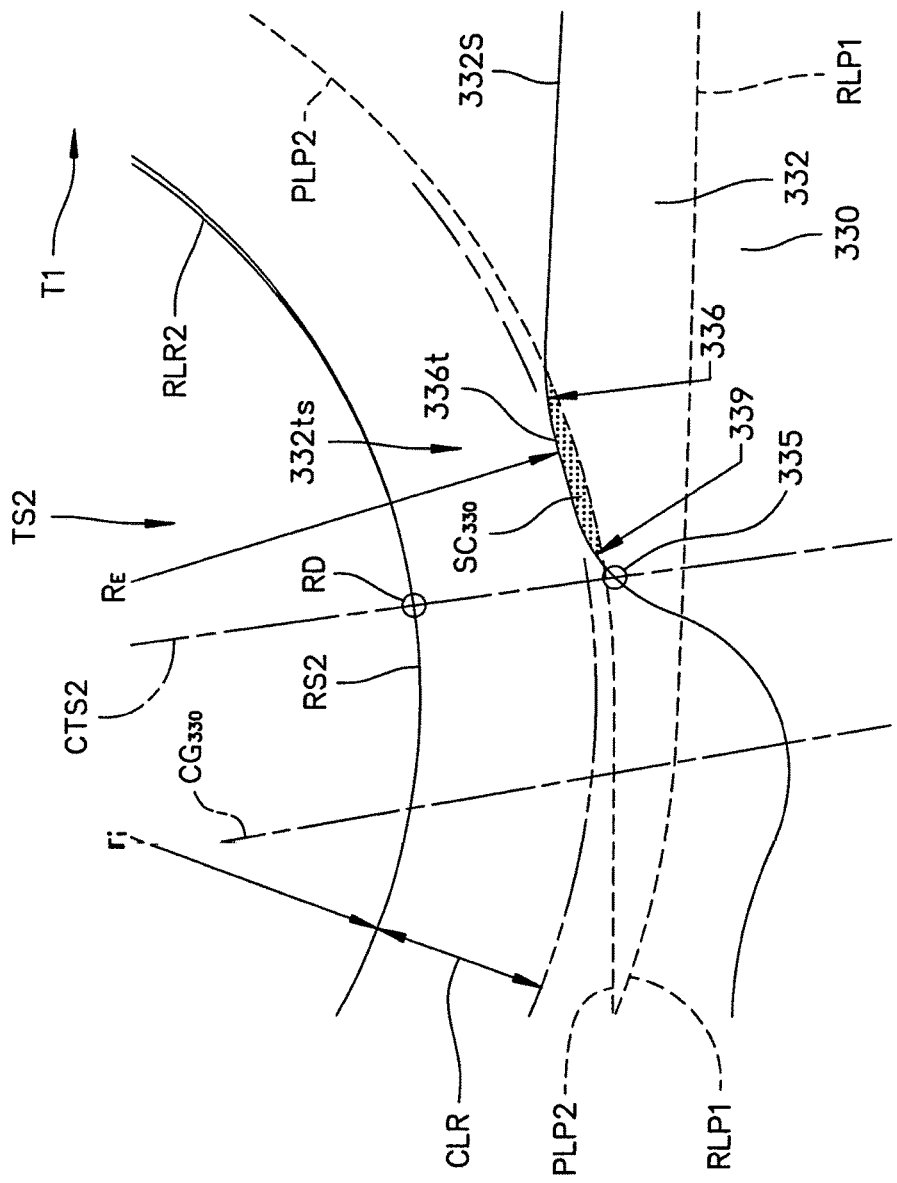
FIG. 9B corresponds to FIG. 9A but shows a shaded region to indicate secondary compression of the meshed link row compression pad 332 by chain links PLP2 of the upstream, next-meshing link row LR2.
Figure 9C:
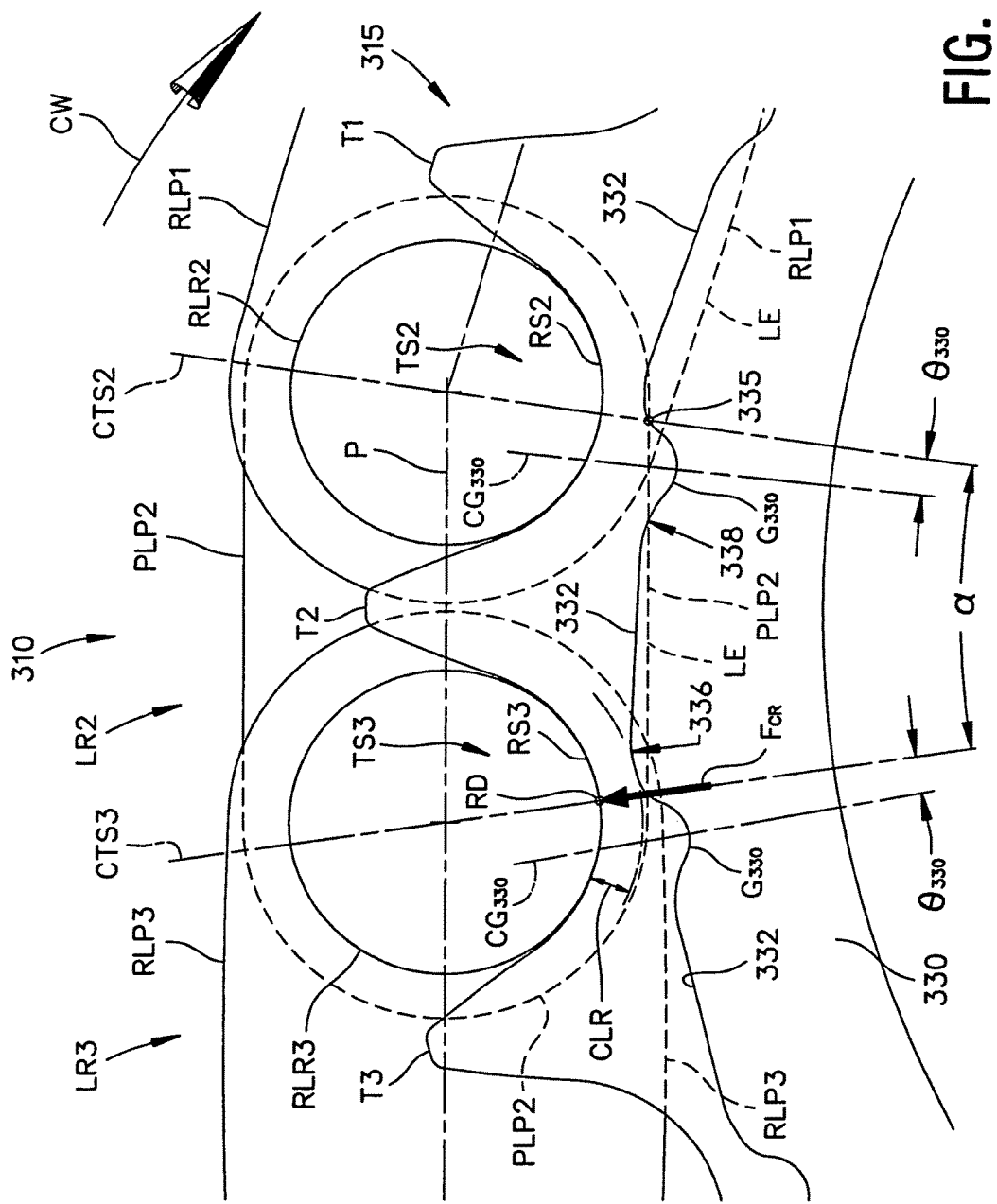
FIG. 9C is an enlarged partial view of the sprocket and chain of FIG. 8 that shows the chain link row LR2 (with smaller height link plates) in a fully meshed position relative to the sprocket with its leading roller RLR2 and a trailing roller RLR3 in fully seated positions in the respective sprocket tooth spaces TS2,TS3.
Figure 9D:
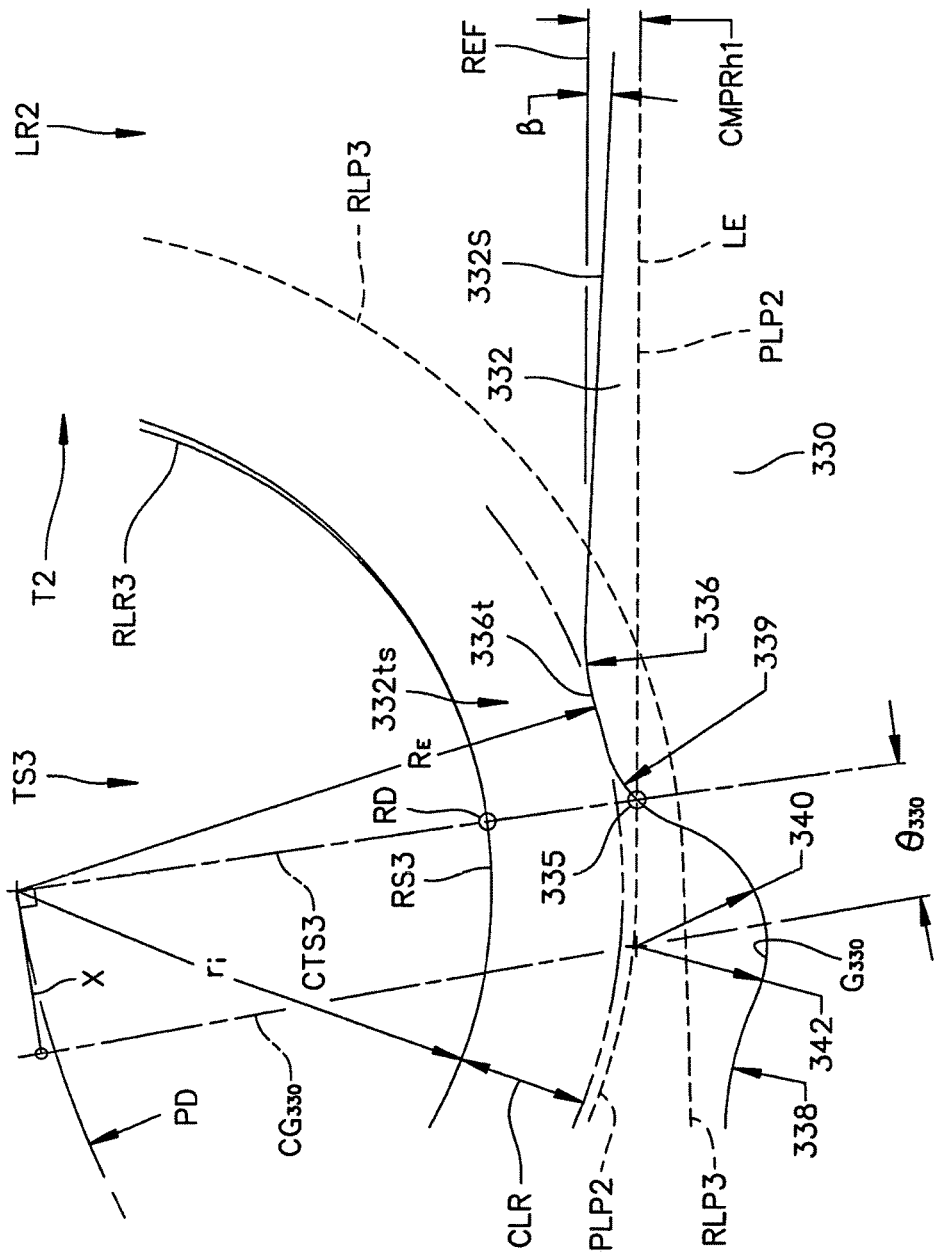
FIG. 9D is a greatly enlarged view of a portion of FIG. 9C showing the tooth space TS3 and the trailing roller RLR3 of the link row LR2 (which is the leading roller of the upstream, next-meshing link row LR3)
Figure 9E:
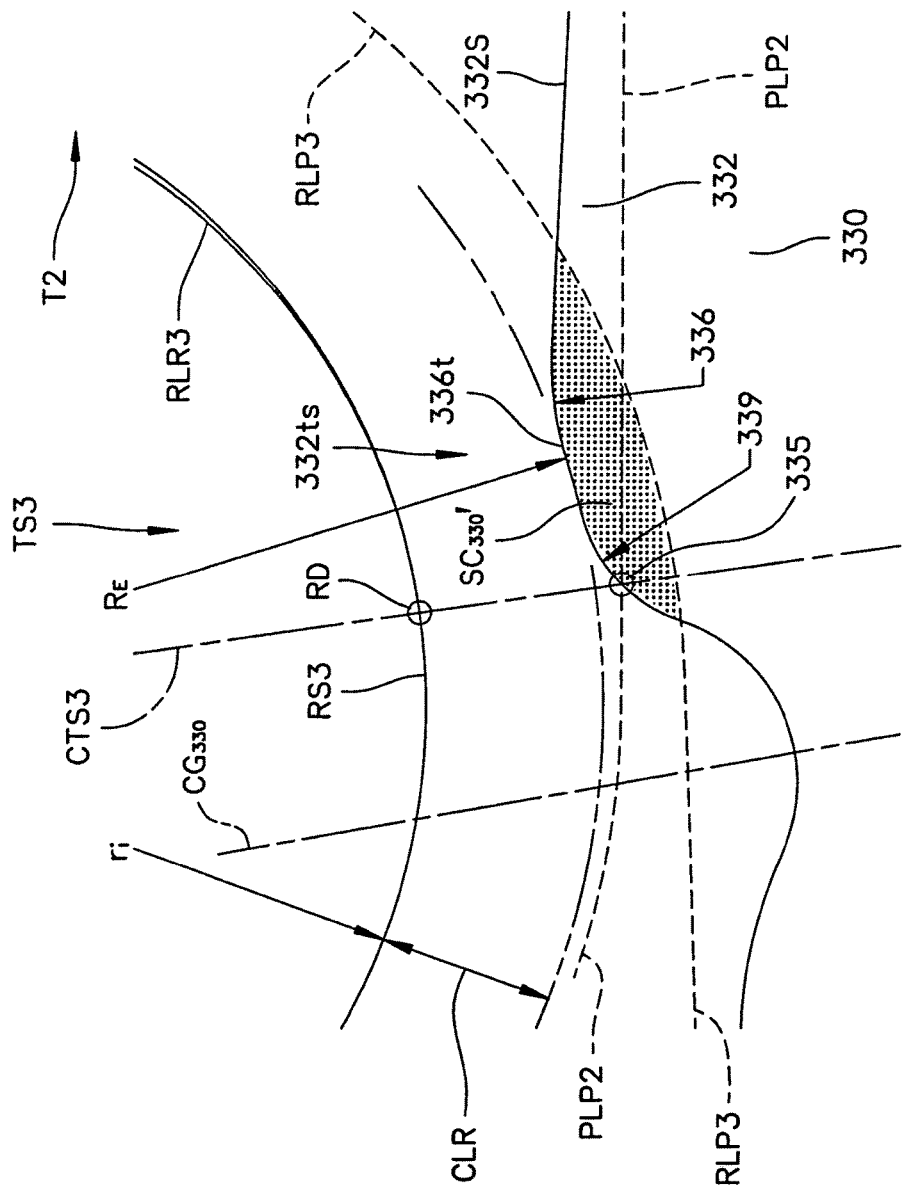
FIG. 9E corresponds to FIG. 9D but shows a shaded region to indicate secondary compression of the meshed link row compression pad 332 by chain links RLP3 of the upstream, next-meshing link row LR3.

FIGS. 8-9E illustrate another alternative cushion ring sprocket 315 that is identical to the cushion ring sprocket 215 except as otherwise shown in the drawings or described herein. Structures of the sprocket 315 that correspond to structures of the sprocket 215 are labeled with reference numbers that are 100 greater than those used for the sprocket 215. In particular, the cushion sprocket 315 differs from the cushion ring sprocket 215 in that the cushion rings 330 are structured and arranged on the sprocket hub 316 such that each tooth space centerline CTS1,CTS2 intersects the second trailing corner surface 339 of a respective compression pad 332 between the opposite ends of the second trailing corner surface 339. In such embodiment, the tooth space centerline CTS1,CTS2 intersects the second trailing corner surface 339 between the location 135 for the cushion ring sprocket 115 and the location 235 for the cushion ring sprocket 215).

As shown herein, the groove offset angle θ directly relates to a linear offset distance X (see e.g., FIG. 5A, 6A) measured normal to the tooth space center CTS2 and tangent to the sprocket pitch diameter PD between the tooth space center CTS2 and the groove center CG130 (FIG. 5A) or CG230 (FIG. 6A). The groove offset angle θ is achieved graphically as a function of satisfying the min and max effective configurations for placing elastomeric material in closer proximity with the meshing roller, preferably in line with or directly under the meshing roller. With regard to Table 2 below, the cushion ring pad was designed for a 22-tooth sprocket and X was calculated to have a minimum value of $X_{MIN}$=0.98 mm and a maximum value $X_{MAX}$=1.47 mm for the 22-tooth sprocket. These X-values were then used as constants to calculate the groove offset angles θ for all other tooth counts as follows:

Sprocket pitch diameter PD=$P$/SIN(180/$Nr$)

where P=sprocket chordal pitch, and

Nr=sprocket tooth count

For the offset groove angle θ shown in FIG. 5A, X is length of the side opposite, where $X$=(PD/2)×TAN(θ), and pitch radius PD/2 is the length of the side adjacent as measured along the centerline of the tooth space CTS from the sprocket center to the point that intersects the sprocket pitch diameter PD. Tan θ=SO/SA where SO=side opposite and SA=side adjacent.

Table 2 provides examples of the axial groove offset angle θ calculated as described above for an 8.0 mm pitch roller chain sprocket with elastomeric cushion rings as described herein:

TABLE 2

Axial Groove Offset Angle θ
8-mm Pitch Roller Chain Sprockets

| Teeth ($N_r$) | PD (mm) | $θ_{130}$ (°) | $X_{MIN}$ (mm) | $θ_{230}$ (°) | $X_{MAX}$ (mm) |
|---|---|---|---|---|---|
| 20 | 51.140 | 2.20 | 0.98 | 3.30 | 1.47 |
| 21 | 53.676 | 2.10 | 0.98 | 3.15 | 1.47 |
| 22 | 56.213 | 2.00 | 0.98 | 3.00 | 1.47 |
| 23 | 58.752 | 1.92 | 0.98 | 2.88 | 1.47 |
| 32 | 81.618 | 1.38 | 0.98 | 2.07 | 1.47 |
| 40 | 101.964 | 1.10 | 0.98 | 1.65 | 1.47 |
| 42 | 107.052 | 1.05 | 0.98 | 1.58 | 1.47 |
| 44 | 112.140 | 1.00 | 0.98 | 1.50 | 1.47 |
| 46 | 117.229 | 0.96 | 0.98 | 1.44 | 1.47 |

FIGS. 8-9E also illustrate a roller chain 310 meshing with cushion ring sprocket 315 including cushion rings 330. Except as otherwise shown in the drawings and/or described herein, the roller chain 310 is identical to the roller chain 10 described above, and like components relative to the chain 10 are identified using like reference characters. More particularly, the chain 310 differs from the chain 10 in that the chain link plates RLP of the inner or "roller" link plate rows (e.g., see row LR1) define a first link plate height h1 between the upper and lower edges UE,LE of each link plate RLP, and the chain link plates PLP of the outer or "pin" link plate rows PLP (e.g., see row LR2) define a second link plate height h2 between the upper and lower edges UE,LE of each link plate PLP. The first and second link plate heights h1, h2 are measured at the midpoint of each link plate in cases where the upper and/or lower edges UE,LE are non-linear. The first and second link plate heights h1, h2 are not equal. In the present example, h1>h2, but this relationship can be reversed. As such, when the chain is pulled straight, the upper and lower edges UE,LE of the roller link plates RLP will project outwardly relative to the upper and lower edges UE,LE of the pin link plates PLP. In one example, the chain 310 is defined as described in U.S. Pat. No. 8,801,554, the entire disclosure of which is hereby expressly incorporated by reference into the present specification.

The compression pads 332 differ from the compression pads 132 or 232 in that the compression pads 332 are defined with a reduced pad height PH (see FIG. 9) as compared to the compression pads 132, 232. The pad height PH is measured as described above for the cushion ring 30. A slight reduction in the pad height PH for the compression pads 332 compromises the primary compression for both the inner (h1/taller) and outer (h2/shorter) link rows, i.e., the compression pads 332 are subjected to primary compression CMPR by the inner (taller) link rows a greater amount than desired, and the compression pads 332 are subjected to primary compression CMPR by the outer (shorter) link rows a lesser amount than desired. So although the pad height PH is slightly reduced as compared to the previous embodiments, the present embodiment establishes the best compression balance for both the inner (h1/taller) and outer (h2/shorter) link rows. It should be noted that, unlike the prior art cushion rings 30, the cushion ring 330 beneficially adds secondary compression $SC_{330}'$ (FIGS. 9D,9E) for the next meshing link row which helps with compression parity. FIGS. 8-9E show the minimum effective groove offset angle $\theta_{330}=2°$ for a 22 tooth sprocket but the maximum groove offset angle $\theta_{330}=3°$ for a 22 tooth sprocket can alternatively be used depending on available packaging space and other design considerations.

More particularly, FIG. 9 shows the chain link row LR1 as the meshing link row. The chain link row LR1 comprises link plates RLP1 with the first (greater) height h1 connecting the leading roller RLR1 and a trailing roller RLR2. The leading roller RLR1 of the meshing link row LR1 is fully meshed with the sprocket 315, i.e., the leading roller RLR1 is fully seated in the tooth space TS1 and is in contact with the root surface RS1. The trailing roller RLR2 is shown at the instant when it completes its meshing process and becomes fully seated in the tooth space TS2 and in contact with the root surface RS2 at contact location RD. The trailing roller RLR2 is also the leading roller of the adjacent next-meshing or upstream chain link row LR2 that is shown at the instant when it is beginning its meshing sequence with the sprocket. The next-meshing link row LR2 comprises link plates PLP2 with the second (lesser) height h2.

FIG. 9C shows the sprocket 315 in a position where it has rotated sufficiently so that the chain link row LR2 is the meshing link row. The chain link row LR2 comprises link plates PLP2 with the second (lesser) height h2 connecting the leading roller RLR2 and a trailing roller RLR3. The leading roller RLR2 of the meshing link row LR2 is fully meshed with the sprocket 315, i.e., the leading roller RLR2 is fully seated in the tooth space TS2 and is in contact with the root surface RS2. The trailing roller RLR3 is shown at the instant when it completes its meshing process and becomes fully seated in the tooth space TS3 and in contact with the root surface RS3 at contact location RD. The trailing roller RLR3 is also the leading roller of the adjacent next-meshing or upstream chain link row LR3 that is shown at the instant when it is beginning its meshing sequence with the sprocket.

FIGS. 9A and 9B show a greatly enlarged portion of FIG. 9, and FIGS. 9D and 9E correspondingly show a greatly enlarged portion of FIG. 9C. As shown in FIG. 9A, the chain link plates RLP1 of height h1 for the link row LR1 compress the involved pad 332 that is located between the tooth spaces TS1,TS2 by a primary compression amount $CMPR_{h1}$. In addition, as shown in FIG. 9B, the chain link plates PLP2 having height h2 of the next meshing (upstream) link row LR2 also contact and compress the same compression pad 332 located between the first and second tooth spaces TS1,TS2 by a secondary compression amount $SC_{330}$ indicated by the shaded area simultaneously with the pad 332 being compressed by the chain links RLP1 of the meshing link row LR1.

FIGS. 9D and 9E correspond respectively to FIGS. 9A and 9B, but show the sprocket 315 in a position where it has rotated sufficiently so that the meshing link row is the chain link row LR2 with the chain link plates PLP2 of a reduced height h2. The chain link plates PLP2 of the fully meshed link row LR2 having the lesser height h2 compress the involved pad 332 that is located between the tooth spaces TS2,TS3 by a primary compression amount $CMPR_{h2}$. In addition, the chain link plates RLP3 of the next meshing (upstream) link row LR3 having the greater height h1 also contact and compress the same compression pad 332 located between the second and third tooth spaces TS2,TS3 by a secondary compression amount $SC_{330}'$ indicated by the shaded area FIG. 9E simultaneously with the pad 332 being compressed by the chain links PLP2 of the meshing link row LR2.

A comparison of FIGS. 9A and 9D shows that the primary compression $CMPR_{h1}$ for the chain link plates RLP having the first (greater) height h1 is greater than the primary compression $CMPR_{h2}$ for the chain link plates PLP having the second (lesser) height h2. Also, a comparison of FIGS. 9B and 9E shows that the secondary compression $SC_{330}$ for the chain link plates PLP having the second (lesser) height h2 is less than the secondary compression $SC_{330}'$ for the chain link plates RLP having the first (greater) height h1. It is important to note, however, the each compression pad 332 provides primary compression $CMPR_{h1}$ or $CMPR_{h2}$, and each compression pad 332 further provides secondary compression $SC_{330}$ or $SC_{330}'$. For a sprocket 315 with an uneven number of teeth T, the primary compression provided by each compression pad 332 will change between $CMPR_{h1}$ and $CMPR_{h2}$, and the secondary compression provided by each compression pad 332 will change between $SC_{330}$ and $SC_{330}'$ as the sprocket rotates.

It can be seen from the above that the cushion rings 330 provide the benefit of providing greater secondary compression $SC_{330}'$ during occurrences of reduced primary compression $CMPR_{h2}$, while the cushion rings 330 provide the decreased secondary compression $SC_{330}$ during occurrences of increased primary compression $CMPR_{h1}$. The increased greater secondary compression $SC_{330}'$ associated with decreased primary compression $CMPR_{h2}$ compensates for the reduction in primary compression to ensure that the damping force vector $F_{CR}$ has a sufficient magnitude despite the reduced primary compression for such link rows. Accordingly, each compression pad 332 contributes damping of the chain meshing process, but none of the compression pads 332 is over-compressed (by the taller link plates RLP) as can lead to damage to the compression pad 332 from compression set, shearing, or the like. Conversely, the reduced secondary compression $SC_{330}$ is associated with occurrences of increased primary compression $CMPR_{h1}$ such that the reduced secondary compression does not reduce the damping force vector $F_{CR}$ below an acceptable level.

FIG. 10 is similar to FIG. 9, but shows an alternative embodiment of an elastomeric cushion ring 430 that is identical to the cushion ring 330 except as otherwise shown and/or described herein, and like features of the cushion ring 430 relative to the cushion ring 330 are identified with like reference characters that are 100 greater than those used in relation to the cushion ring 330. The cushion ring 430 includes compression pads 432 that are defined with different pad heights PH1,PH2 (generally PH) relative to each other and that are arranged in an alternating sequence about the sprocket body 15B. A first set of compression pads 432a is defined with a first pad height PH1 and a second set of compression pads 432b is defined with a second pad height PH2, wherein PH1<PH2. The cushion rings 430 located on opposite sides of the sprocket body 15B are identically structured and circumferentially registered with each other such that compression pads 432a,432b of matching pad heights are circumferentially aligned with respect to each other. In a timed system in which the sprocket body 15B has an even tooth count such that the relative position between the chain 310 and sprocket body 15B is known, by providing compression pads 432 of alternating heights PH1,PH2, the variation in the magnitude of primary compression CMPR can be more tightly controlled. In such a timed system, the chain 310 is meshed with the sprocket body 15B such that the decreased pad height PH1 counteracts the increased link plate height h1 for the inner link rows RLP to prevent excessive primary compression CMPR for the inner link rows, while the increased pad height PH2 beneficially increases the primary compression CMPR for the outer pin link rows PLP with the reduced link plate height h2.

Any of the cushion ring sprockets 115,115',215,315 is optionally constructed such that circumferentially successive compression pads 132,132',232,332 are defined with alternating varying magnitudes of the groove offset angle θ by which the grooves $G_{130}, G_{130}', G_{230}, G_{330}$ are negatively offset relative to the tooth space centers CTS such that the circumferentially successive compression pads are correspondingly located with alternating varying magnitudes of upstream shifting or translation of the compression pads as compared to each other. In such an embodiment, the pad heights PH can be uniform or alternating between first and second heights PH1,PH2 as described above in relation to FIG. 10.

Any of the sprockets 115, 115',215,315 can optionally be structured such that the compression pad incline angle β is alternated between two different magnitudes with respect to circumferentially successive compression pads 132, 132', 232,332 (with or without also varying the pad height PH and magnitude of the groove offset angle θ). In one example in which the sprocket body has an even number of teeth T and is used in a timed system, the compression pads 132, 132', 232, 332 that will be engaged by the pin link plates PLP are defined with an incline angle β=0° while the compression pads 132, 132',232,332 that will be engaged by the roller link plates RLP are defined with an incline angle β=1°, but other incline angles can be used.

The invention has been described with reference to preferred embodiments. Modifications and alterations will occur to those of ordinary skill in the art to which the invention pertains, and it is intended that the claims be construed as broadly as possible to encompass all such modifications and alterations while preserving the validity of the claims.

The invention claimed is:

1. A roller chain sprocket comprising:
a body comprising a hub;
a row of teeth that extends circumferentially around the hub such that the hub extends axially outward on opposite first and second sides of the row of teeth, said teeth separated from each other by tooth spaces, wherein each of said tooth spaces is bisected by a radial tooth space centerline;
first and second elastomeric cushion rings respectively bonded to the hub on said opposite first and second sides of the row of teeth, each cushion ring extending circumferentially about said hub and comprising a plurality of compression pads separated from each other by axially extending transverse grooves;
each of said compression pads comprising a planar outer surface that is connected to a respective preceding one of said grooves by a leading corner surface and connected to a respective trailing one of said grooves by a trailing corner surface;
each of said grooves located radially inward from a respective associated one of said tooth spaces such that the tooth space centerline is circumferentially aligned with said trailing corner surface that connects said groove to a preceding one of said compression pads;
wherein said trailing corner surface of each of said compression pads comprises a compound surface that is joined at an outer end to the planar outer surface of the compression pad and that is joined at an inner end to a trailing one of said grooves, said compound surface comprising:
a first trailing corner surface defined by a first corner radius, wherein said first trailing corner surface is convex with respect to said respective associated one of the tooth spaces;
a second trailing corner surface defined by a second corner radius, wherein said second trailing corner surface is convex with respect to said respective associated one of the tooth spaces; and
a transition surface defined by a circular arc segment that connects the first trailing corner surface with the second trailing corner surface, wherein said transition surface is concave with respect to said respective associated one of the tooth spaces.

2. The roller chain sprocket as set forth in claim 1, wherein, for each of said compression pads, said first trailing corner surface is tangent at one end to the planar outer surface of the compression pad and is tangent at an opposite end to the transition surface.

3. The roller chain sprocket as set forth in claim 2, wherein each of said grooves comprises a leading groove radius, and wherein, for each of said compression pads, an inner end of said second trailing corner surface is tangent to said leading groove radius of one of said grooves located upstream from said compression pad and an outer end of said second trailing corner surface is tangent to said transition surface.

4. The roller chain sprocket as set forth in claim 3, wherein the tooth space centerline of the associated tooth space for each of said grooves is circumferentially aligned with a location where the leading groove radius is tangent to said inner end of said second trailing corner surface.

5. The roller chain sprocket as set forth in claim 3, wherein each of said grooves comprises said leading groove radius and further comprises a trailing groove radius, wherein the leading groove radius and the trailing groove radius are tangent to each other at their respective inner ends and comprise respective arc centers that are each located on a groove centerline, wherein said groove centerline is negatively angularly offset by a groove offset angle relative to said tooth space centerline that bisects the associated tooth space.

6. The roller chain sprocket as set forth in claim 2, wherein:
each of said tooth spaces comprises a root surface defined by a root radius having an arc center located on the tooth space centerline;
each of said tooth spaces is associated with a clearance zone defined adjacent the opposite first and second sides of the row of teeth between said root surface and an arc inscribed by a clearance radius, wherein said clearance radius is larger than said root radius and has an arc center that is common with the arc center of said root radius, wherein said clearance zone is devoid of any part of said elastomeric cushion rings.

7. The roller chain sprocket as set forth in claim 6, wherein said transition surface follows an arcuate path defined by the clearance radius.

8. The roller chain sprocket as set forth in claim 5, wherein said groove offset angle has a minimum value of 2° and a maximum value of 3°.

9. The roller chain sprocket as set forth in claim 1, wherein the transition surface is tangent to the second trailing corner surface, and wherein the tooth space centerline of the associated tooth space for each of said grooves is circumferentially aligned with a location where the transition surface is tangent to second trailing corner surface.

10. The roller chain sprocket as set forth in claim 1, further comprising:
a roller chain meshed with said sprocket, said roller chain comprising a plurality of link rows each comprising a leading roller and a trailing roller interconnected by link plates, wherein first and second rollers of a first row of said chain are respectively seated in first and second tooth spaces adjacent a first tooth of said sprocket, and wherein said first and second cushion rings comprise respective first and second involved compression pads located on opposite first and second lateral sides of said first tooth such that the link plates of the first row respectively engage and compress the first and second involved compression pads with a primary compression and such that the link plates of a next-meshing upstream link row of the chain respectively engage and compress the first and second involved compression pads with a secondary compression that occurs simultaneously with said primary compression.

11. A roller chain sprocket comprising:
a body comprising a hub;
a row of teeth that extends circumferentially around the hub such that the hub extends axially outward on opposite first and second sides of the row of teeth, said teeth separated from each other by tooth spaces, wherein each of said tooth spaces is bisected by a radial tooth space centerline;
first and second elastomeric cushion rings respectively bonded to the hub on said opposite first and second sides of the row of teeth, each cushion ring extending circumferentially about said hub and comprising a plurality of compression pads separated from each other by axially extending transverse grooves;
each of said compression pads comprising a planar outer surface that is connected to a respective preceding one of said grooves by a leading corner surface and connected to a respective trailing one of said grooves by a trailing corner surface;
each of said grooves located radially inward from a respective associated one of said tooth spaces such that the tooth space centerline is circumferentially aligned with said trailing corner surface that connects said groove to a preceding one of said compression pads;
wherein said trailing corner surface of each of said compression pads comprises a compound surface that is joined at an outer end to the planar outer surface of the compression pad and that is joined at an inner end to a trailing one of said grooves, said compound surface comprising:
a first trailing corner surface defined by a first corner radius;
a second trailing corner surface defined by a second corner radius; and
a transition surface defined by a circular arc segment that connects the first trailing corner surface with the second trailing corner surface;
each of said grooves comprising a leading groove radius that is tangent to said second trailing corner radius;
wherein the tooth space centerline of the associated tooth space for each of said grooves is circumferentially aligned with a location where the leading groove radius is tangent to second trailing corner surface.

12. The roller chain sprocket as set forth in claim 11, wherein:
each of said tooth spaces comprises a root surface defined by a root radius having an arc center located on the tooth space centerline;
each of said tooth spaces is associated with a clearance zone defined adjacent the opposite first and second sides of the row of teeth between said root surface and an arc inscribed by a clearance radius, wherein said clearance radius is larger than said root radius and has an arc center that is common with the arc center of said root radius, wherein said clearance zone is devoid of any part of said elastomeric cushion rings.

13. The roller chain sprocket as set forth in claim 12, wherein said transition surface follows an arcuate path defined by the clearance radius.

14. A roller chain sprocket comprising:
a body comprising a hub;
a row of teeth that extends circumferentially around the hub such that the hub extends axially outward on opposite first and second sides of the row of teeth, said teeth separated from each other by tooth spaces, wherein each of said tooth spaces is bisected by a radial tooth space centerline;
first and second elastomeric cushion rings respectively bonded to the hub on said opposite first and second sides of the row of teeth, each cushion ring extending circumferentially about said hub and comprising a plurality of compression pads separated from each other by axially extending transverse grooves;
each of said compression pads comprising a planar outer surface that is connected to a respective preceding one of said grooves by a leading corner surface and connected to a respective trailing one of said grooves by a trailing corner surface;
each of said grooves located radially inward from a respective associated one of said tooth spaces such that the tooth space centerline is circumferentially aligned with said trailing corner surface that connects said groove to a preceding one of said compression pads;
wherein said trailing corner surface of each of said compression pads comprises a compound surface that is joined at an outer end to the planar outer surface of the compression pad and that is joined at an inner end to a trailing one of said grooves, said compound surface comprising:
a first trailing corner surface defined by a first corner radius;
a second trailing corner surface defined by a second corner radius; and
a transition surface defined by a circular arc segment that connects the first trailing corner surface with the second trailing corner surface;
each of said grooves comprising a leading groove radius that is tangent to said second trailing corner radius and each of said grooves further comprising a trailing groove radius, wherein the leading groove radius and the trailing groove radius are tangent to each other at their respective inner ends and comprise respective arc centers that are each located on a groove centerline, wherein said groove centerline is negatively angularly offset by a groove offset angle relative to a tooth space centerline that bisects the associated tooth space.

15. The roller chain sprocket as set forth in claim 11, further comprising:

a roller chain meshed with said sprocket, said roller chain comprising a plurality of link rows each comprising a leading roller and a trailing roller interconnected by link plates, wherein first and second rollers of a first row of said chain are respectively seated in first and second tooth spaces adjacent a first tooth of said sprocket, and wherein said first and second cushion rings comprise respective first and second involved compression pads located on opposite first and second lateral sides of said first tooth such that the link plates of the first row respectively engage and compress the first and second involved compression pads with a primary compression and such that the link plates of a next-meshing upstream link row of the chain respectively engage and compress the first and second involved compression pads with a secondary compression that occurs simultaneously with said primary compression.

16. The roller chain sprocket as set forth in claim 14, wherein said groove offset angle has a minimum value of 2° and a maximum value of 3°.

17. A roller chain sprocket comprising:
a body comprising a hub;
a row of teeth that extends circumferentially around the hub such that the hub extends axially outward on opposite first and second sides of the row of teeth, said teeth separated from each other by tooth spaces, wherein each of said tooth spaces is bisected by a radial tooth space centerline;
first and second elastomeric cushion rings respectively bonded to the hub on said opposite first and second sides of the row of teeth, each cushion ring extending circumferentially about said hub and comprising a plurality of compression pads separated from each other by axially extending transverse grooves;
each of said compression pads comprising a flat outer surface that is connected to a respective preceding one of said grooves by a leading corner surface and connected to a respective trailing one of said grooves by a trailing corner surface;
wherein each of said grooves is located radially inward from a respective associated one of said tooth spaces and said cushion rings are arranged on said hub such that the tooth space centerline of the associated tooth space is circumferentially aligned with part of said trailing corner surface located between said flat outer surface of a leading compression pad and a centerline of said groove.

18. The roller chain sprocket as set forth in claim 17, wherein:
said groove centerline of each of said grooves is negatively angularly offset by a groove offset angle relative to said tooth space centerline that bisects the associated tooth space;
a linear offset distance X is defined when measured between the tooth space centerline and the groove centerline when measured normal to the tooth space centerline and tangent to a pitch diameter PD of said sprocket; and,
said linear distance is in the range of:

$$0.98 \text{ mm} \leq X \leq 1.47 \text{ mm}.$$

19. The roller chain sprocket as set forth in claim 18, wherein said groove comprises a leading groove radius and a trailing groove radius, and wherein the leading groove radius and the trailing groove radius are tangent to each other at their respective inner ends and comprise respective arc centers that are each located on said groove centerline.

* * * * *